(12) United States Patent
Kawabata

(10) Patent No.: US 10,530,946 B2
(45) Date of Patent: Jan. 7, 2020

(54) INFORMATION PROCESSING APPARATUS, CONTROL METHOD OF INFORMATION PROCESSING APPARATUS, PROGRAM, AND INFORMATION PROCESSING SYSTEM FOR EFFICIENTLY TRANSMITTING UPDATED MANAGED INFORMATION TO OTHER INFORMATION PROCESSING APPARATUSES

(71) Applicant: Konica Minolta Inc., Tokyo (JP)

(72) Inventor: Hiroyuki Kawabata, Kawanishi (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 16/185,803

(22) Filed: Nov. 9, 2018

(65) Prior Publication Data
US 2019/0174018 A1    Jun. 6, 2019

(30) Foreign Application Priority Data

Dec. 5, 2017 (JP) .................................. 2017-233460

(51) Int. Cl.
| | | |
|---|---|---|
| G06F 15/00 | (2006.01) | |
| G06F 3/12 | (2006.01) | |
| G06K 1/00 | (2006.01) | |
| H04N 1/00 | (2006.01) | |

(52) U.S. Cl.
CPC ..... *H04N 1/00514* (2013.01); *H04N 1/00244* (2013.01); *H04N 1/00344* (2013.01); *H04N 1/00973* (2013.01); *H04N 2201/0094* (2013.01)

(58) Field of Classification Search
CPC .......... H04N 1/00514; H04N 1/00244; H04N 1/00344; H04N 1/00973; H04N 2201/0094
USPC ............................. 358/1.13, 1.1, 1.15, 1.14
See application file for complete search history.

(56) References Cited

U.S. PATENT DOCUMENTS

2003/0236767 A1* 12/2003 Akiyama ................ G06F 16/78
2016/0150023 A1*  5/2016 Umehara ............ H04L 12/1818
                                                              709/228

FOREIGN PATENT DOCUMENTS

JP          2008283436         11/2008

* cited by examiner

*Primary Examiner* — Douglas Q Tran
(74) *Attorney, Agent, or Firm* — Rankin, Hill & Clark LLP

(57) ABSTRACT

There is provided an information processing apparatus enabled to share managed information that is managed and customizable for an individual user with a plurality of other information processing apparatuses, and the information processing apparatus includes a hardware processor that: acquires update information indicating that managed information of a specific user among a plurality of users has been updated by customization; determines some information processing apparatuses among the plurality of other information processing apparatuses, as distribution destination apparatuses to share updated managed information of the specific user, based on a use history of the specific user, after acquisition of the update information; and transmits the updated managed information to the some information processing apparatuses determined as the distribution destination apparatuses, after the acquisition of the update information.

29 Claims, 20 Drawing Sheets

FIG. 5

| USER | TRANSFER APPARATUS |
|---|---|
| U1 | MFP10a |
| U2 | MFP10b |
| U3 | MFP10a |

FIG. 6

| USER | NUMBER OF TIMES OF USE OF MFP10b | NUMBER OF TIMES OF USE OF MFP10c |
|---|---|---|
| U1 | 10 | 20 |

FIG. 7

| USER | MOST RECENT USE TIME POINT OF MFP10b | MOST RECENT USE TIME POINT OF MFP10c |
|---|---|---|
| U1 | 8/20/2017 17:00 | 8/28/2017 14:30 |

FIG. 12

| USER | NUMBER OF TIMES OF USE | | | | TOTAL NUMBER OF TIMES OF USE |
|---|---|---|---|---|---|
| | 10a | 10b | 10c | 10d | |
| U1 | 30 | 10 | 20 | 0 | 60 |
| U3 | 5 | 0 | 5 | 5 | 15 |

FIG. 13

| USER | MOST RECENT USE TIME POINT | | | | LATEST USE TIME POINT |
|---|---|---|---|---|---|
| | 10a | 10b | 10c | 10d | |
| U1 | 9/1/2017 10:15 | 8/20/2017 17:00 | 8/28/2017 14:30 | – | 9/1/2017 10:15 |
| U3 | 7/25/2017 11:20 | – | 8/10/2017 17:00 | 8/5/2017 13:45 | 8/10/2017 17:00 |

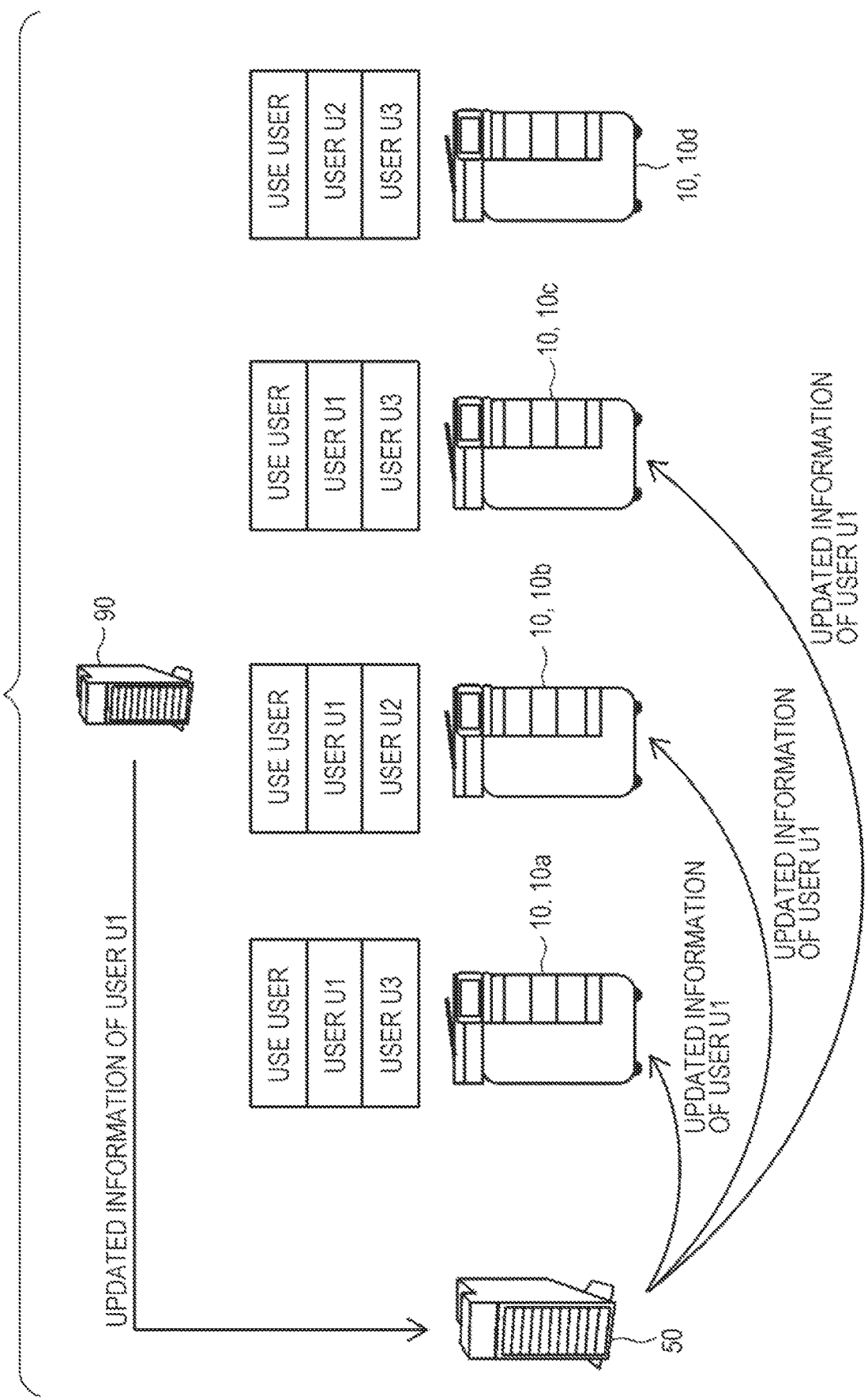

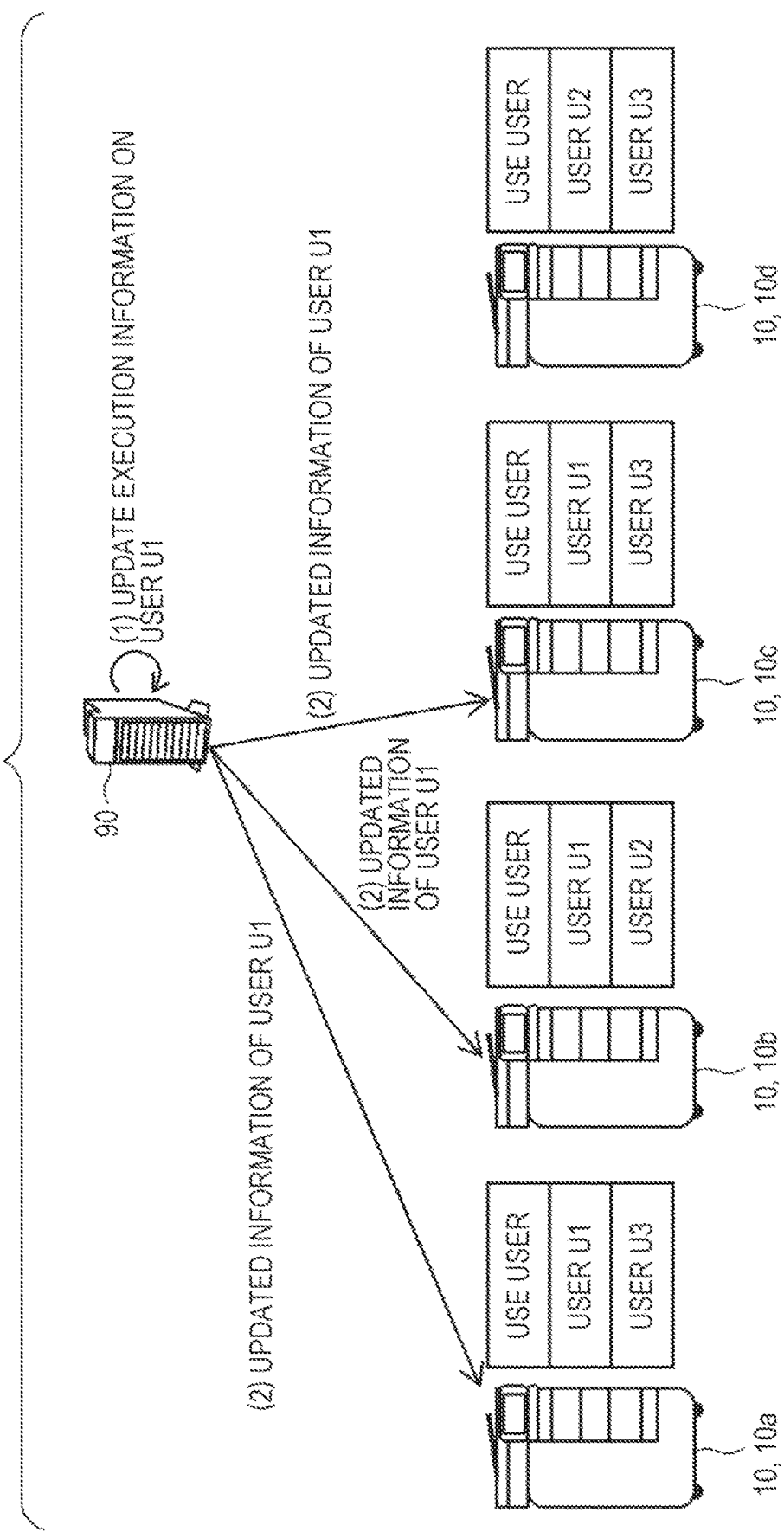

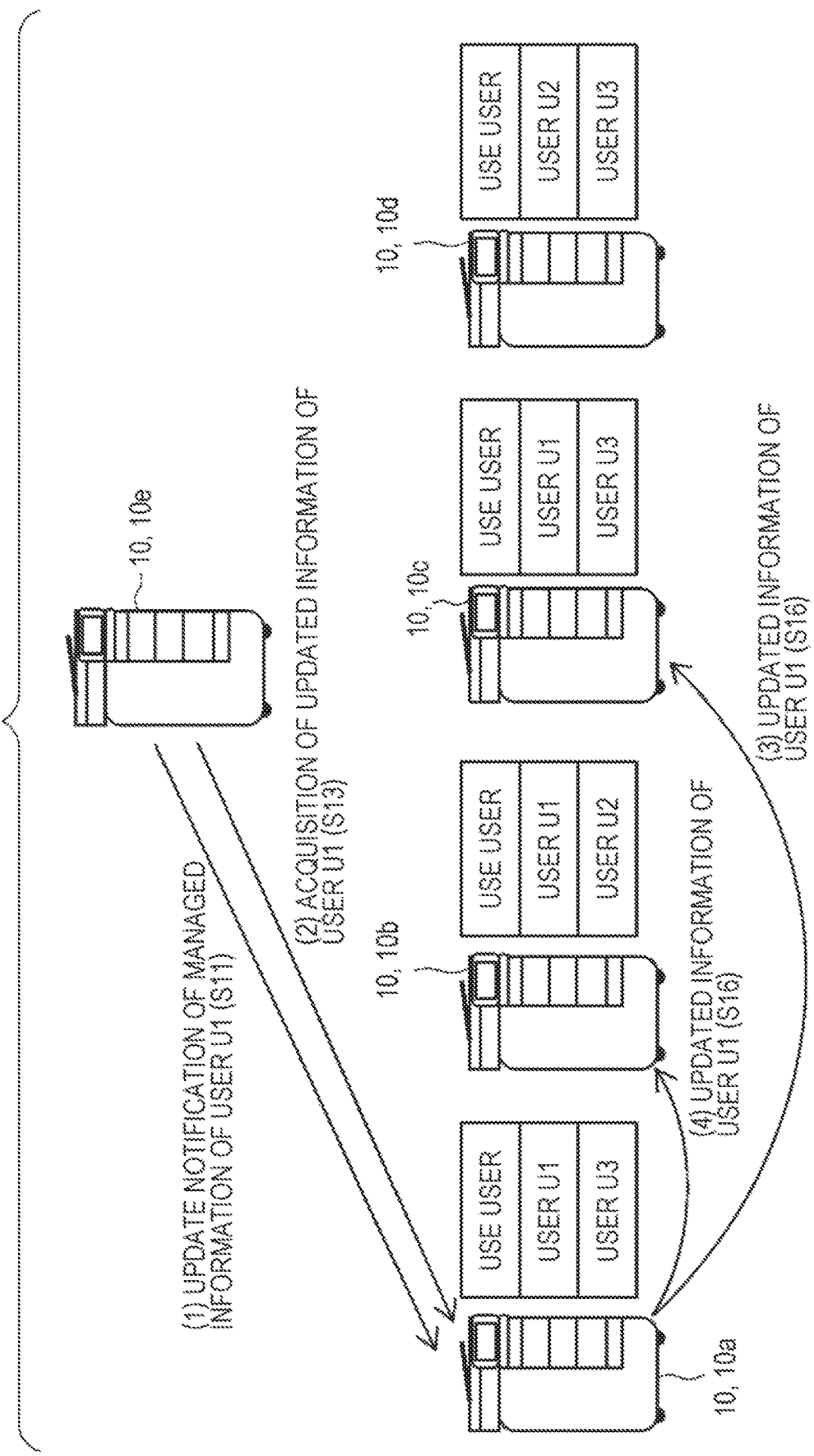

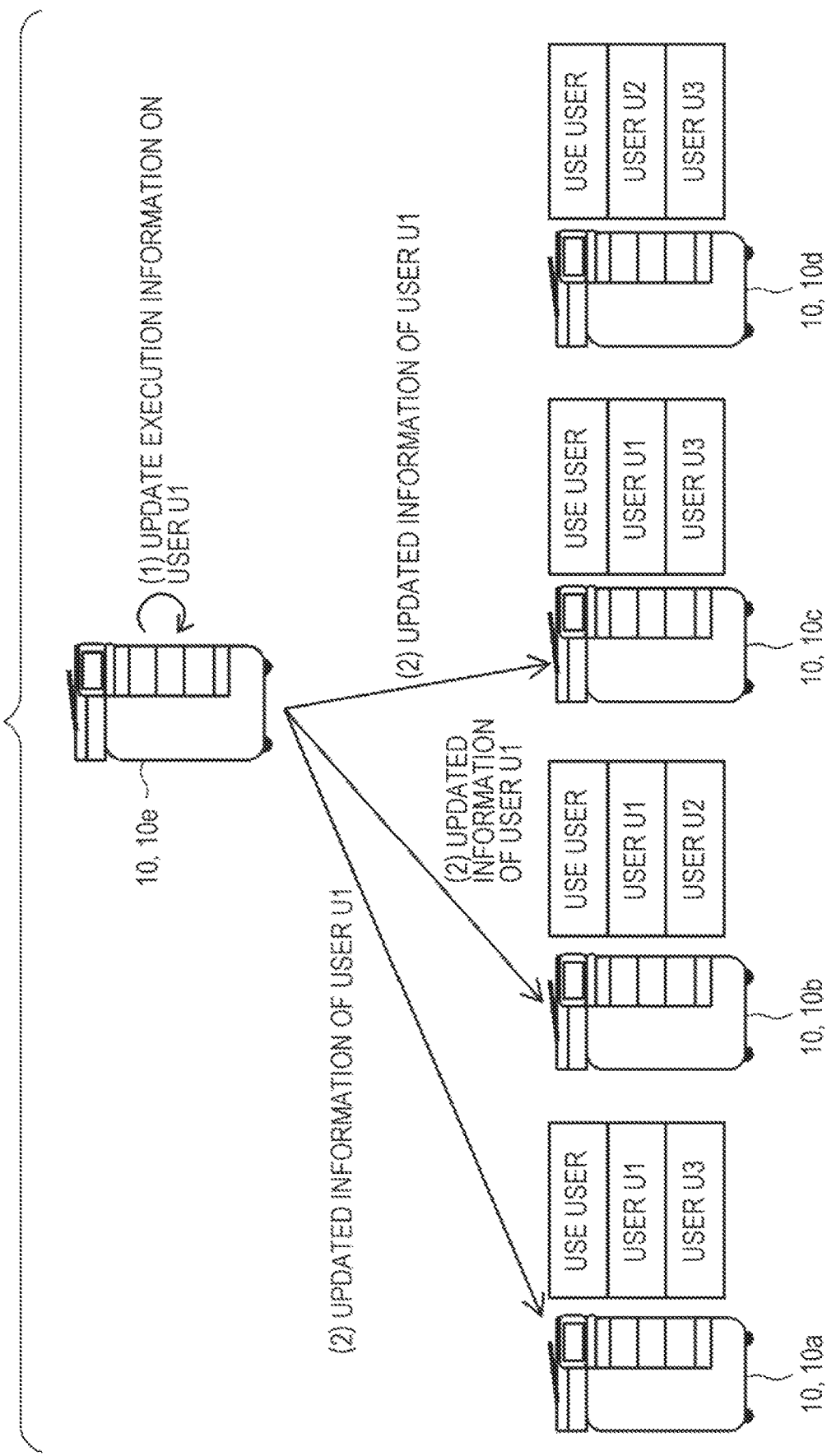

INFORMATION PROCESSING APPARATUS, CONTROL METHOD OF INFORMATION PROCESSING APPARATUS, PROGRAM, AND INFORMATION PROCESSING SYSTEM FOR EFFICIENTLY TRANSMITTING UPDATED MANAGED INFORMATION TO OTHER INFORMATION PROCESSING APPARATUSES

The entire disclosure of Japanese patent Application No. 2017-233460, filed on Dec. 5, 2017, is incorporated herein by reference in its entirety.

BACKGROUND

Technological Field

The present invention relates to an information processing apparatus and a technique related thereto.

Description of the Related Art

There is a technique to transmit updated managed information (updated information) of a specific user to all of plural information processing apparatuses when the managed information managed for the specific user has been updated.

For example, JP 2008-283436 A describes that, in a system including plural image processing apparatuses, when operation screen data customized for a specific user has been updated in a certain image processing apparatus, updated operation screen data of the specific user is transmitted to all the other image processing apparatuses.

However, it is not necessarily efficient to transmit the updated managed information (uniformly) to all of plural other information processing apparatuses.

SUMMARY

It is therefore an object of the present invention to provide a technique capable of efficiently transmitting updated managed information.

To achieve the abovementioned object, according to an aspect of the present invention, there is provided an information processing apparatus enabled to share managed information that is managed and customizable for an individual user with a plurality of other information processing apparatuses, and the information processing apparatus reflecting one aspect of the present invention comprises a hardware processor that: acquires update information indicating that managed information of a specific user among a plurality of users has been updated by customization: determines some information processing apparatuses among the plurality of other information processing apparatuses, as distribution destination apparatuses to share updated managed information of the specific user, based on a use history of the specific user, after acquisition of the update information; and transmits the updated managed information to the some information processing apparatuses determined as the distribution destination apparatuses, after the acquisition of the update information.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 5 is a diagram illustrating the transfer apparatus for updated data of each user;

FIG. 6 is a diagram illustrating the number of times of use of each apparatus already used by a specific user;

FIG. 7 is a diagram illustrating the most recent use time point of each apparatus already used by the specific user;

FIG. 12 is a diagram illustrating the number of times of use of each of plural distribution destination candidate apparatuses by each user;

FIG. 13 is a diagram illustrating the most recent use time point of each of the plural distribution destination candidate apparatuses by each user;

FIG. 20 is a conceptual diagram illustrating schematic operation of the information processing system according to a modification;

FIG. 21 is a conceptual diagram illustrating schematic operation of the information processing system according to a modification;

FIG. 22 is a conceptual diagram illustrating schematic operation of the information processing system according to a modification; and FIG. 23 is a conceptual diagram illustrating schematic operation of the information processing system according to a modification.

DETAILED DESCRIPTION OF EMBODIMENTS

Hereinafter, one or more embodiments of the present invention will be described with reference to the drawings. However, the scope of the invention is not limited to the disclosed embodiments.

1. First Embodiment

1-1. Configuration Overview

Figure 1:
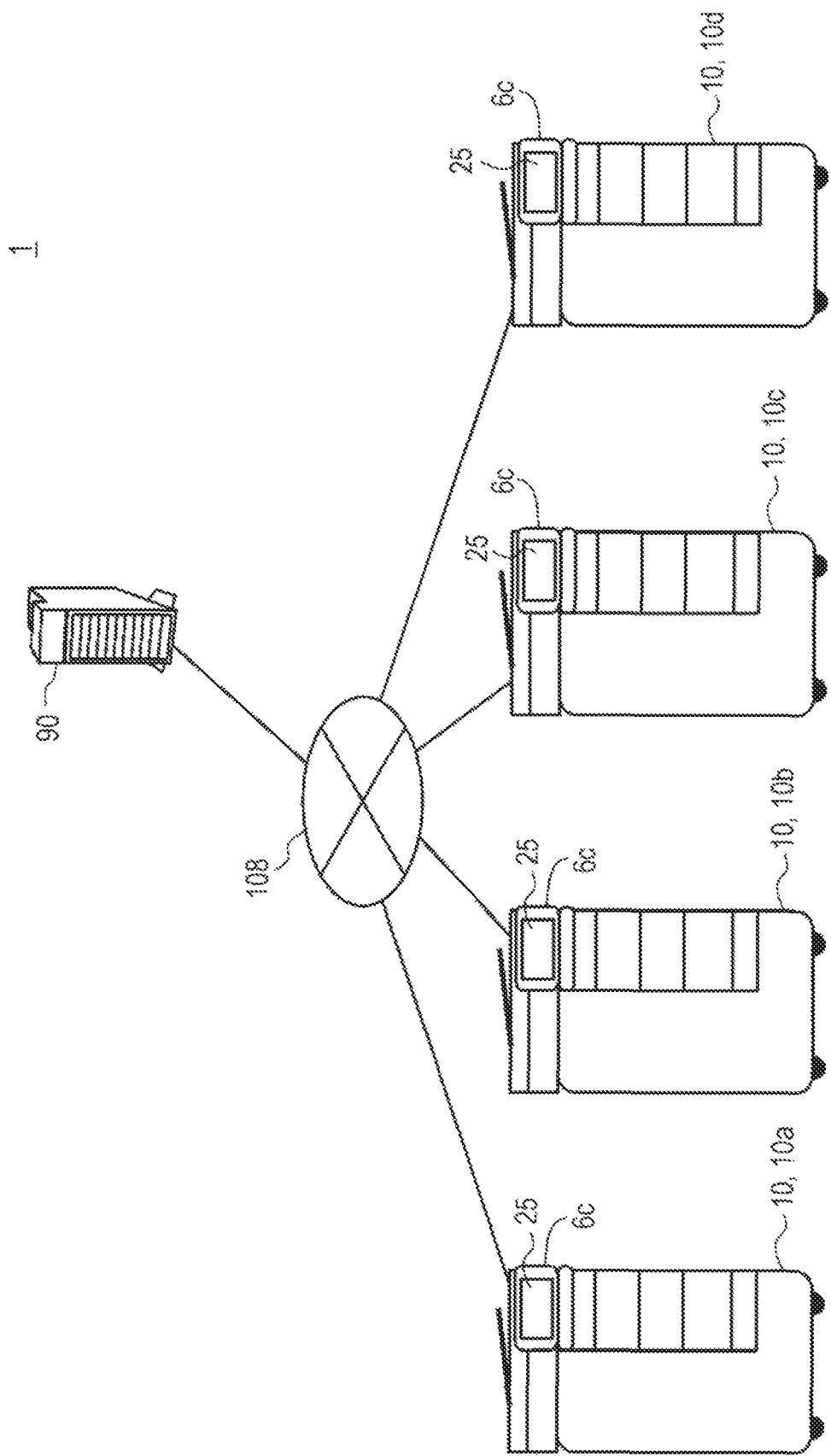
FIG. 1 is a diagram illustrating an information processing system.

FIG. 1 is a diagram illustrating an information processing system (information distribution system) 1 according to the present invention. As illustrated in FIG. 1, the information processing system 1 includes plural multi-functional peripherals (MFPs) 10 (10a to 10d) and a management server 90.

The elements 10 and 90 in the present system 1 are communicably connected to each other via a network 108. The network 108 includes a local area network (LAN) and the Internet. The connection mode to the network 108 may be a wired connection or a wireless connection.

The plural MFPs 10 are provided inside a certain LAN constructed in a company or the like. On the other hand, the management server 90 is provided outside the LAN. Note that, this is not a limitation, and the management server 90 may be provided inside the LAN.

The management server 90 is an external apparatus (external server) provided separately from the plural MFPs 10. The management server 90 functions as a management apparatus that manages managed information (described below) of each of plural users.

The managed information is information that is managed for each user and can be used (shared) by the plural MFPs 10. Here, operation screen information (operation screen data) on an operation screen (an operation screen corresponding to each user) that can be displayed on each MFP 10 is stored (managed) as managed information in the management server 90.

Specifically, in the information processing system 1, a user can customize (change) various operation screens displayed on a touch panel 25 (FIG. 1) of the MFP 10 for the user. For example, the user can customize an icon (such as a call button for a setting screen of a specific job) to be displayed on a top menu screen (not illustrated) and its arrangement position. Data (operation screen data (customized screen data)) of an operation screen (customized screen) customized by the user is transmitted to the management server 90 from the MFP 10 on which customizing operation has been performed, and is stored associated with the user in the management server 90.

In the information processing system 1, the operation screen data corresponding to each user (operation screen data for each user) is stored not only in the management server 90 but also in the MFP 10 having a use history (login history) (also refereed to as "apparatus already used"). For example, the operation screen data of a user U1 (operation screen data for the user U1) is stored not only in the management server 90 but also in the MFPs 10 (for example, MFPs 10a, 10b, and 10c) each having a use history of the user U1.

Specifically, in the MFP 10 having the use history of the user U1, the operation screen data of the user U1 is stored (newly stored) in the following manner. Note that, newly storing processing described below is executed at a time point before transfer processing (transfer processing (distribution processing) of the operation screen data of the user U1) described later.

More specifically, when a login by the user U1 is accepted in a certain MFP 10 (for example, the MFP 10c), the MFP 10c decides whether or not the operation screen data (operation screen data for the user U1) of the login user U1 is stored in the MFP 10c. For example, when the user U1 logs in to the MFP 10c for the first time (when the user U1 logs in to the MFP 10 not having the use history), the MFP 10c decides that the operation screen data of the login user U1 is not stored in the MFP 10c. When such a decision is made, the MFP 10c requests the operation screen data of the user U1 from the management server 90, and the management server 90 transmits the operation screen data of the user U1 to the MFP 10c in response to the request. Then, the MFP 10c displays a screen (operation screen) (not illustrated) based on the operation screen data of the user U1 received from the management server 90 on the touch panel 25 (see FIG. 1) of the MFP 10c, and stores (newly stores) the operation screen data of the user U1 in the MFP 10c. In this way, the operation screen data of the user U1 (use user) is stored (newly stored) in the MFP 10 having the use history of the user U1.

Note that, here, the operation screen data of the user (operation screen data before update) is stored in the apparatus already used by the user; however, this is not a limitation, and the operation screen data (operation screen data before update) of the user does not have to be stored in the apparatus already used by the user.

1-2. Configuration of MFP

Figure 2:
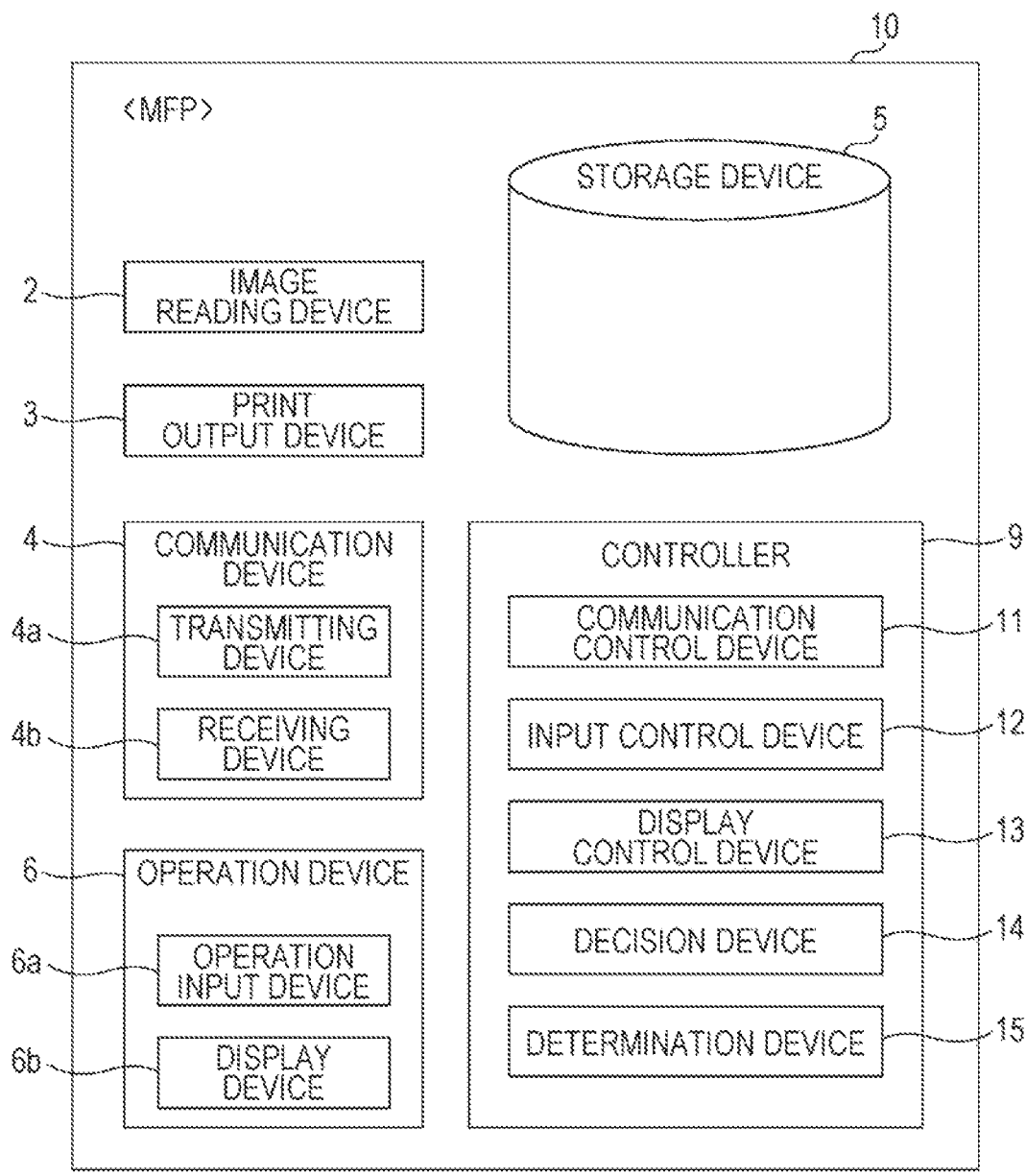
FIG. 2 is a diagram illustrating functional blocks of an image processing apparatus (MFP)

FIG. 2 is a diagram illustrating functional blocks of the MFP 10.

The MFP 10 is an apparatus (also referred to as a multifunction machine) having a scan function, a copy function, a facsimile function, a box storage function, and the like. Specifically, as illustrated in the functional block diagram of FIG. 2, the MFP 10 includes: an image reading device 2; a print output device 3; a communication device 4; a storage device 5; an operation device 6; and a controller (control device) 9, and implements various functions by operating these devices in combination. The MFP 10 is also referred to as an image processing apparatus or an image forming apparatus.

The image reading device 2 is a processing device that optically reads (that is, scans) a document placed at a predetermined position of the MFP 10 and generates image data (also referred to as a document image or a scan image) of the document.

The print output device 3 is an output device that prints and outputs an image on various media such as paper, based on data relating to a print target.

The communication device 4 is a processing device capable of performing facsimile communication via a public line or the like. Further, the communication device 4 can perform network communication via the network 108. In the network communication, various protocols are used, for example, transmission control protocol/internet protocol (TCP/IP). By using the network communication, the MFP 10 can exchange various data with a desired destination (the management server 90 or the like). The communication device 4 includes a transmitting device 4a that transmits various data, and a receiving device 4b that receives various data. For example, the receiving device 4b (in detail, the receiving device 4b of the MFP 10 operating as a transfer apparatus (described later)) acquires (receives), from the management server 90, update information indicating that operation screen data of a specific user among the plural users has been updated by customization. The update information is also referred to as update execution information indicating that update of the operation screen data of the specific user among the plural users has been executed by the management server 90.

The storage device 5 includes storage apparatuses such as a hard disk drive (HDD) and a semiconductor memory. The storage device 5 stores use history information (number of times of use, login time, and the like) relating to a user (use user) having a use history of the MFP 10.

The operation device 6 includes an operation input device 6a that accepts an operation input to the MFP 10, and a display device 6b that displays and outputs various types of information.

The MFP 10 is provided with an operation panel device 6c having a substantially plate shape (see FIG. 1). The operation panel device 6c includes the touch panel 25 (see FIG. 1) on its front side. The touch panel 25 functions as a part of the operation input device 6a, and also functions as a part of the display device 6b. The touch panel 25 includes various sensors embedded in a liquid crystal display panel, and can display various types of information and accept various operation inputs from an operating user.

The controller 9 is incorporated in the MFP 10, and is a control apparatus that comprehensively controls the MFP 10. The controller 9 is configured as a computer system including a central processing unit (CPU) (also referred to as a microprocessor or a computer processor), and various semiconductor memories (RAM and ROM). The controller 9 implements various processing devices by executing a predetermined software program (hereinafter, also simply referred to as a program) stored in the ROM (for example, EEPROM (registered trademark)) by the CPU. Note that, the program (in detail, a program module group) may be recorded in a portable recording medium such as a USB memory, read from the recording medium, and installed in the MFP 10. Alternatively, the program may be downloaded via the network 108 or the like, and installed in the MFP 10.

Specifically, as illustrated in FIG. 2, the controller 9 implements various processing devices including a communication control device 11, the input control device 12, a display control device 13, a decision device 14, and a determination device 15, by executing the program.

The communication control device 11 is a processing device that controls communication operation with other apparatuses (the management server 90, the other MFP 10, and the like) in cooperation with the communication device 4 and the like. The communication control device 11 includes a transmission control device that controls transmission operation of various data, and a reception control device that controls reception operation of various data. For example, in cooperation with the communication device 4, the communication control device 11 (in detail, the communication control device 11 of the MFP 10 operating as a transfer apparatus (described later)) receives, from the management server 90, updated data of the operation screen data (also referred to as updated data or updated information) of the specific user. In addition, in cooperation with the communication device 4, the communication control device 11 (in detail, the communication control device 11 of the MFP 10 operating as a transfer apparatus) transmits the updated data (updated operation screen data) received from the management server 90 to some apparatuses among plural distribution destination candidate apparatuses (apparatuses enabled to share the updated data). Note that, the distribution destination candidate apparatus is a candidate for a distribution destination apparatus to which the updated data should be distributed to share the updated data.

The input control device 12 is a control device that controls operation input operation to the operation input device 6a (the touch panel 25 or the like). For example, the input control device 12 controls operation of receiving an operation input to an operation screen displayed on the touch panel 25.

The display control device 13 is a processing device that controls display operation on the display device 6b (touch panel 25 or the like).

The decision device 14 is a processing device that executes various types of decision operation.

The determination device 15 is a processing device that executes processing of determining the distribution destination apparatus to share the updated data of the specific user, based on the use history of the specific user.

Note that, the above-described various types of operation are mainly executed by executing software programs by the CPU of the controller 9; however, this is not a limitation, and the above-described various types of operation may be executed by dedicated hardware provided in the MFP 10 (in detail, inside or outside the controller 9), or the like. For example, all or part of the communication control device 11, the input control device 12, the display control device 13, the decision device 14, and the determination device 15 (FIG. 2) may be implemented by using one or more dedicated hardware devices.

1-3. Operation

When operation screen data of a certain user (for example, the user U1) has been updated, in the above-described conventional technique (the technique described in JP 2008-283436 A), updated operation screen data (updated data) of the certain user (U1) is transmitted to all the plural distribution destination candidate apparatuses (candidate for the distribution destination apparatus to which the updated data should be distributed to share the updated data). In other words, in the above-described conventional technique, when the operation screen data of the user U1 has been updated, the updated data of the user U1 is transmitted not only to the MFP 10 ("apparatus already used") having the use history of the user U1 but also to the MFP 10 having no use history of the user U1 ("apparatus not used").

However, it is not efficient to transmit the updated data to all the distribution destination candidate apparatuses. Specifically, a possibility (possibility of use) is relatively low that the MFP 10 (apparatus not used) having no use history of the user U1 is used by the user U1. For that reason, when the updated data of the user U1 is transmitted also to the apparatus not used by the user U1, although the possibility is relatively low that the updated data is used, the updated data is stored in the apparatus not used, and a storage area of the apparatus not used (storage area for storing the updated data) is wastefully consumed.

To avoid such a situation, in the information processing system 1, the updated data of the specific user is transmitted to some apparatuses (some apparatuses including the apparatus already used by the specific user) among the plural distribution destination candidate apparatuses. In other words, the updated data of the specific user is not transmitted to a remaining apparatus (here, the MFP 10 (apparatus not used) not having the use history of the specific user) excluding the some apparatuses among the plural distribution destination candidate apparatuses.

Here, as for transmission (distribution) of the updated data front the management server 90 to the some apparatuses, the following two distribution paths are conceivable.

The first path is a distribution path (see FIG. 21) that directly transmits the updated data from the management server 90 to the some apparatuses. The second path is a distribution path that transfers the updated data from the management server 90 to the some apparatuses via a representative apparatus (the MFP 10 that functions as a transfer apparatus described later) inside the LAN to which the some apparatuses belong (see FIG. 3). Here, a mode will be exemplified in which the updated data is transmitted (distributed) from the management server 90 to the some apparatuses by using the latter path. Note that, the former path (see FIG. 21) will be described later.

Figure 3:
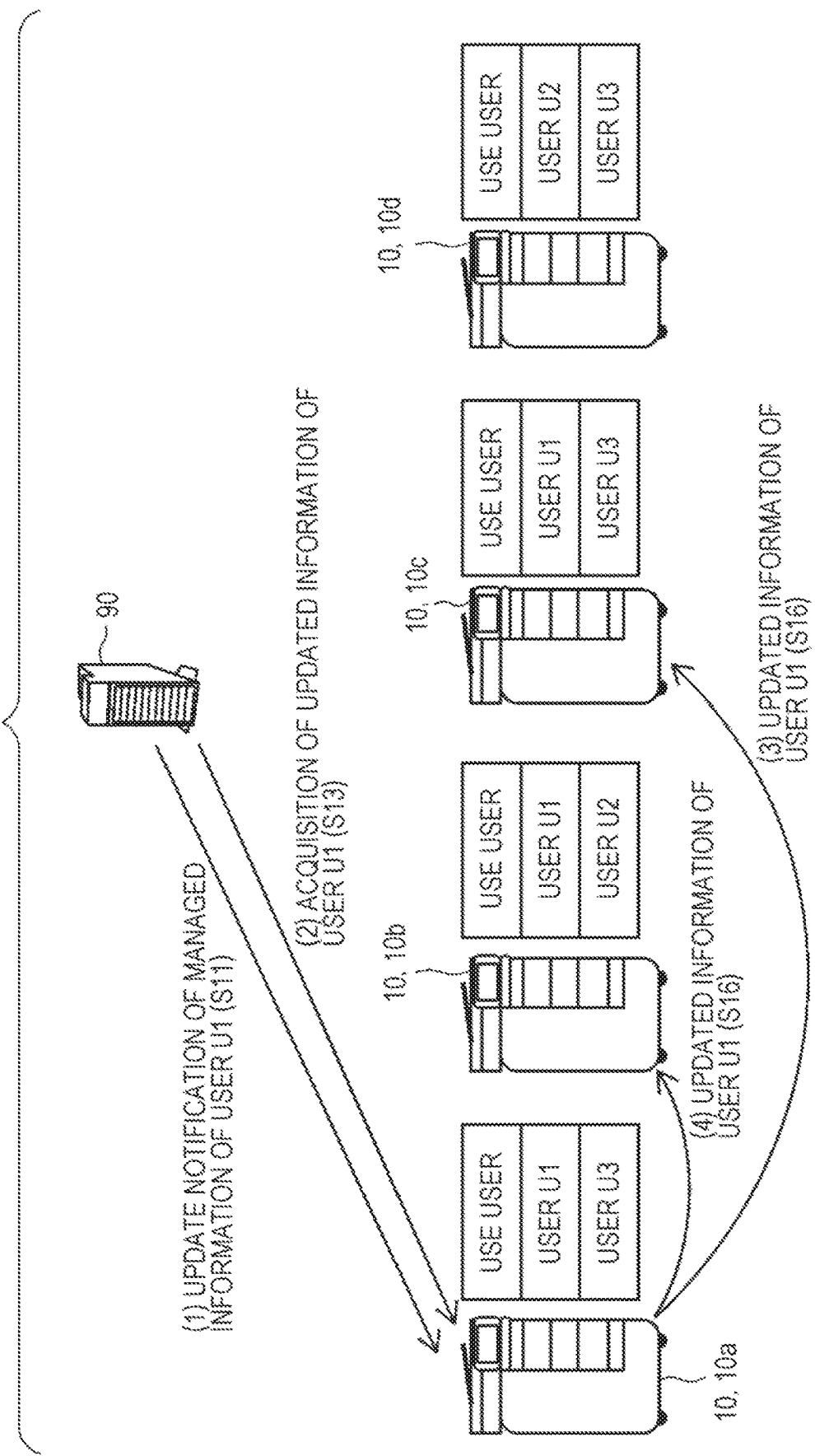
FIG. 3 is a conceptual diagram illustrating schematic operation of the information processing system.
Figure 4:
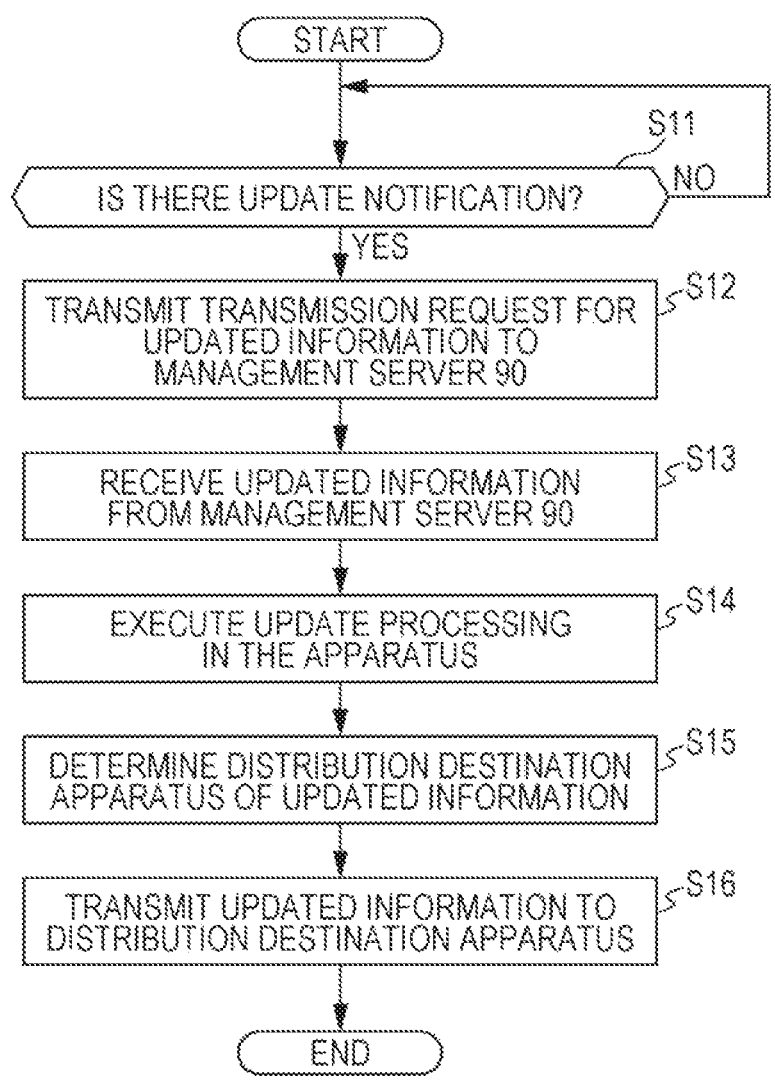
FIG. 4 is a flowchart illustrating operation of the MFP (transfer apparatus)

FIG. 3 is a conceptual diagram illustrating schematic operation of the information processing system 1. FIG. 4 is a flowchart illustrating operation of the MFP 10 (for example, the MFP 10*a*) that functions as a transfer apparatus (described later).

As illustrated in the figures, in response to update execution information (update notification) indicating that operation screen data of a specific user (for example, the user U1) has been updated by customization, the transfer apparatus (for example, the MFP 10*a*) acquires the updated operation screen data (updated data) of the user (U1) from the management server 90 (steps S1 to S13). Then, the transfer apparatus (MFP 10*a*) transmits the updated data of the specific user (U1) to some apparatuses (some apparatuses 10*b* and 10*c* including apparatuses 10*b* and 10*c* already used by the specific user U1) among the plural distribution destination candidate apparatuses (here, plural other MFPs 10*b* to 10*d*). In other words, the one MFP 10 (10*a*) does not transmit the updated data of the specific user (U1) to the remaining MFP 10 (here, the apparatus 10*d* not used by the specific user (U1)) excluding the some apparatuses 10*b* and 10*c* among the plural distribution destination candidate apparatuses 10*b* to 10*d*.

Note that, here, the transfer apparatus (for example, the MFP 10*a*) functions as an information processing apparatus (update control apparatus) that controls transmission and reception of various types of information (updated data and the like) between the management server 90 and the distribution destination apparatus in the information processing system 1.

Details of such operation will be described below.

Specifically, first, the management server 90 decides presence or absence of update of operation screen data (operation screen data in the management server 90) of each of the plural users (registered users) at a predetermined timing (at a predetermined update check timing (for example, in response to arrival of a predetermined scheduled confirmation time (12:00, or the like))). Here, it is decided that the operation screen data of the user U1 among the plural users has been updated by customization.

Note that, prior to the predetermined time point, the updated operation screen data of the user U1 is transmitted to the management server 90 from the MFP 10 (for example, the MFP 10*c*) having accepted customizing operation by the user U1 (operation that changes (customizes) the operation screen for the user U1 from the operation screen before update to a new operation screen), and then is updated in the management server 90.

When the management server 90 decides that the operation screen data of the user U1 has been updated, the management server 90 transmits to a specific MFP 10 (transfer apparatus) an update notification (update execution information) indicating that the operation screen data of the user U1 among the plural users has been updated by customization.

Specifically, in the management server 90, for each of the plural users, a transfer apparatus is registered in advance that executes transfer processing of the updated data from the management server 90 to some apparatuses (some apparatuses including the apparatus already used) among the plural distribution destination candidate apparatuses (see FIG. 5).

FIG. 5 is a diagram illustrating the transfer apparatus for updated data of each user. Here, the transfer apparatus for the updated data of the user U1 is the MFP 10*a*, and the transfer apparatus for the updated data of the user U2 is the MFP 10*b*. The transfer apparatus for the updated data of the user U3 is the MFP 10*a*. Note that, here, it is assumed that the transfer apparatus for the updated data of each user has the use history of each user (see also FIG. 3). However, this is not a limitation, and the transfer apparatus for the updated data of each user does not have to have the use history of each user.

Based on such registered contents, the management server 90 transmits, to the transfer apparatus (here, the MFP 10*a*) for the updated data of the user U1, the update notification indicating that the operation screen data of the user U1 has been updated by customization.

Then, in the transfer apparatus, the operation of FIG. 4 is executed. The operation of the flowchart of FIG. 4 is executed in the MFP 10 registered as the transfer apparatus for the updated data of any of the users. Here, the operation in the MFP 10*a*. (transfer apparatus for the updated data of the user U1) will be described.

First, in step S11, the transfer apparatus (here, the MFP 10*a*) waits for an update notification from the management server 90. Then, when the update notification (notification indicating that the operation screen data of a specific user (here, the user U1) has been updated by customization) is acquired (received) from the management server 90 (see also FIG. 3), the processing proceeds from step S11 to step S12.

In step S12, the transfer apparatus (MFP 10*a*) transmits a transmission request for the updated data of the specific user (update target user) (U1) to the management server 90. Then, in response to the transmission request, the management server 90 transmits the updated data corresponding to the update target user (U1) to the MFP 10*a* (transfer apparatus for the updated data of the user U1) (see also FIG. 3).

The transfer apparatus 10*a*, when receiving the updated data of the update target user U1 from the management server 90 (step S13), executes the transfer processing of the updated data (steps S15 and S16).

Note that, here, the transfer apparatus 10*a* itself also has the use history of the user U1 (see also FIG. 3), and the transfer apparatus 10*a* also stores the operation screen data of the user U1. For that reason, the transfer apparatus 10*a* executes update processing in the transfer apparatus 10*a* (step S14). Here, prior to the transfer processing of the updated data (steps S15 and S16), the transfer apparatus 10*a* executes the update processing in the transfer apparatus 10*a* (step S14). Specifically, the transfer apparatus 10*a* overwrites and registers (overwrites and saves) the updated data (updated operation screen data of the user U1) received from the management server 90 on the operation screen data (operation screen data before update) of the user U1 in the transfer apparatus 10*a*.

Then, the processing proceeds from step S14 to steps S15 and S16, and the transfer apparatus 10*a* transfers the updated data of the update target user U1 to some apparatuses among the plural distribution destination candidate apparatuses (here, apparatuses already used by the update target user among the plural distribution destination candidate apparatuses).

Specifically, first, the transfer apparatus (here, the MFP 10a) determines the distribution destination apparatus (apparatus to which the updated data should be distributed to share the updated data) to share the updated data of the update target user (here, the user U1), based on the use history of the update target user (U1) (step S15).

More specifically, the transfer apparatus 10a inquires presence or absence of the use history of the update target user U1 of the plural distribution destination candidate apparatuses (here, remaining MFPs 10 (10b to 10d) excluding the transfer apparatus 10a among the plural MFPs 10a to 10d), to acquire the use history (step S15). Here, the MFPs 10b and 10c each have the use history of the user U1 (see FIG. 3), and the transfer apparatus 10a acquires from each of the MFPs 10b and 10c an inquiry result that each MFP has the use history of the update target user U1. On the other hand, the MFP 10d does not have the use history of the user U1 (see FIG. 3), and the transfer apparatus 10a acquires from the MFP 10d an inquiry result that the MFP 10d does not have the use history of the update target user U1. Then, the transfer apparatus 10a specifies the MFPs 10b and 10c among the plural distribution destination candidate apparatuses 10b to 10d, as the apparatus already used by the update target user U1, and determines the MFPs 10b and 10c as the distribution destination apparatuses of the updated data of the update target user U1.

Then, the processing proceeds from step S15 to step S16, and the transfer apparatus automatically transfers the updated data of the update target user to (only) some MFPs 10 determined as the distribution destination apparatuses among the plural distribution destination candidate apparatuses (plural other MFPs 10). Here, the transfer apparatus 10a automatically transfers the updated data of the update target user U1 to only the MFPs 10b and 10c (apparatuses already used by the update target user U1) determined as the distribution destination apparatuses among the plural distribution candidate apparatuses 10b to 10d (see also FIG. 3). In other words, the transfer apparatus 10a does not transfer the updated data of the update target user U1 to the apparatus (the apparatus 10d not used by the update target user U1) other than the apparatuses 10b and 10c determined as the distribution destination apparatuses among the plural distribution destination candidate apparatuses 10b to 10d.

Here, when there are plural distribution destination apparatuses (here, the MFPs 10b and 10c), the transfer apparatus 10a executes transmission (transfer processing) of the updated data to the plural distribution destination apparatuses (MFPs 10b and 10c) in order from an apparatus having a larger number of times of use (number of times of login) by the update target user U1.

Specifically, the transfer apparatus 10a inquires of the MFPs 10 (10b and 10c) determined as the distribution destination apparatuses the number of times of use (the number of times of use from the time point before a predetermined period (for example, three months) to the current time point, or the total number of times of use in the past) by the update target user U1, to acquire the number of times of use. Here, it is acquired from the distribution destination apparatus 10b that the number of times of use of the distribution destination apparatus 10b by the user U1 is 10 (see also FIG. 6), and it is acquired from the distribution destination apparatus 10c that the number of times of use of the distribution destination apparatus 10c by the user U1 is 20 (see also FIG. 6). In this case, the number of times of use of the distribution destination apparatus 10c by the user U1 is greater than the number of times of use of the distribution destination apparatus 10b by the user U1, and the transfer apparatus 10a transmits the updated data of the user U1 in the order of the distribution destination apparatuses 10c and 10b (see also FIG. 3). In other words, the transfer apparatus 10a transmits the updated data of the update target user U1 (preferentially) to the distribution destination apparatus 10c most frequently used by the user U1 earlier than the other distribution destination apparatus 10b.

In this way, the transfer apparatus (here, the MFP 10a) receives the updated data of the update target user from the management server 90 and transmits the updated data to some apparatuses (here, the apparatus already used by the update target user) among the plural distribution destination candidate apparatuses automatically.

When receiving the updated data of the update target user (U1) from the transfer apparatus (MFP 10a), the some apparatuses (here, the MFPs 10b and 10c) update the operation screen data of the update target user (U1) in the some apparatuses to the updated operation screen data received from the transfer apparatus (10a). As a result, in the MFPs 10a to 10c, the updated operation screen data of the user U1 is shared.

Note that, here, the processing steps of FIG. 4 are executed in the transfer apparatus (MFP 10a) for the updated data of the user U1; however, the processing steps of FIG. 4 are executed also in the transfer apparatus for the updated data of another user.

For example, when the operation screen data of the user U2 has been updated in the management server 90, the processing steps of FIG. 4 are executed in the transfer apparatus (here, the MFP 10b) for the updated data of the user U2 (see FIG. 5).

Specifically, an update notification indicating that the operation screen data of the user U2 has been updated by customization is transmitted from the management server 90 to the transfer apparatus 10b. Then, after receiving the updated data of the update target user U2 from the management server 90 (step S13), the transfer apparatus 10b determines some apparatuses among the plural distribution destination candidate apparatuses (the plural other MFPs 10a, 10c, and 10d), as the distribution destination apparatuses of the updated data of the update target user U2 (step S15). In detail, the transfer apparatus 10b determines, as the distribution destination apparatus, an apparatus (here, the MFP 10d (see also FIG. 3)) already used by the update target user U2 among the plural distribution destination candidate apparatuses (MFPs 10a, 10c, and 10d). Then, the transfer apparatus 10b transmits the updated data of the update target user U2 to (only) the MFP 10 (MFP 10d) determined as the distribution destination apparatus among the plural distribution destination candidate apparatuses (MFPs 10a, 10c, and 10d) (step S16).

As described above, in the first embodiment, the updated data of the specific user is transmitted to some apparatuses (for example, the MFPs 10b and 10c) determined as the distribution destination apparatuses, based on the use history of the specific user whose operation screen data has been updated, among the plural distribution destination candidate apparatuses (for example, the MFPs 10b to 10d) (step S16) (see FIG. 3). For that reason, the updated data of the specific user is transmitted to the MFPs 10b and 10c each having a relatively higher possibility (than the apparatus not used) of being used by the specific user among the plural distribution destination candidate apparatuses. In other words, the updated data of the specific user is not transmitted to the MFP 10d (apparatus not used) having a relatively low possibility of being used by the specific user among the plural distribution destination candidate apparatuses. Therefore, the updated managed information can be efficiently transmitted.

When there are the plural distribution destination apparatuses (here, the MFPs 10b and 10c), the transmission of the updated data to the plural distribution destination apparatuses is executed in order from an apparatus (here, in the order of MFPs 10c and 10b) having a larger number of times of use by the specific user. In other words, the updated data of the specific user is transmitted to the distribution destination apparatus 10c frequently used by the specific user earlier than the distribution destination apparatus 10b not used frequently by the specific user. Therefore, the updated data of the specific user can be transmitted to the MFP 10c having a relatively high possibility of being used soon by the specific user earlier than the MFP 10b having a relatively low possibility of being used soon by the specific user. Consequently, the update processing of the operation screen data of the specific user can be executed in the MFP 10c earlier than in the MFP 1-4. Modified Example of First Embodiment In the first embodiment, when there are the plural distribution destination apparatuses, the transmission (transfer processing) of the updated data to the plural distribution destination apparatuses is executed in order from an apparatus having a larger number of times of use by the update target user; however, this is not a limitation.

For example, when there are the plural distribution destination apparatuses (for example, the MFPs 10b and 10c), the transmission of the updated data to the plural distribution destination apparatuses may be executed in order form an apparatus having a newer most recent use time point by the update target user (for example, the user U1).

Specifically, the transfer apparatus (for example, the MFP 10a) inquires the most recent use time point (most recent login time) by the update target user U1 of the MFP 10 (here, the MFP 10a) determined as the distribution destination apparatus among the plural distribution destination candidate apparatuses (here, the MFPs 10b and 10c), to acquire the most recent use time point. Here, it is acquired from the distribution destination apparatus 10b that the most recent use time point of the distribution destination apparatus 10b by the update target user U1 is 17:00 on Aug. 20, 2017 (see FIG. 7). In addition, it is acquired from the distribution destination apparatus 10c that the most recent use time point of the distribution destination apparatus 10c by the update target user U1 is 14:30 on Aug. 28, 2017 (see FIG. 7). In this case, the most recent use time point of the distribution destination apparatus 10c by the user U1 is newer (closer to the current time point) than the most recent use time point of the distribution destination apparatus 10b by the user U1, and the transfer apparatus 10a transmits the updated data of the user U1 in the order of the distribution destination apparatuses 10c and 10b. In other words, the transfer apparatus 10a transmits the updated data of the user U1 to the distribution destination apparatus 10c used by the user U1 at the time point closest to the current time point (preferentially) earlier than other distribution destination apparatus 10b.

As described above, when there are the plural distribution destination apparatuses, the transmission of the updated data to the plural distribution destination apparatuses may be executed in order from the apparatus having a newer most recent use time point by the update target user among the plural distribution destination apparatuses.

Alternatively, when there are the plural distribution destination apparatuses (for example, the MFPs 10b and 10c), the updated data of the update target user (for example, the user U1) may be transmitted preferentially to an apparatus provided in a room where the update target user exists among the plural distribution destination apparatuses.

Figure 8:
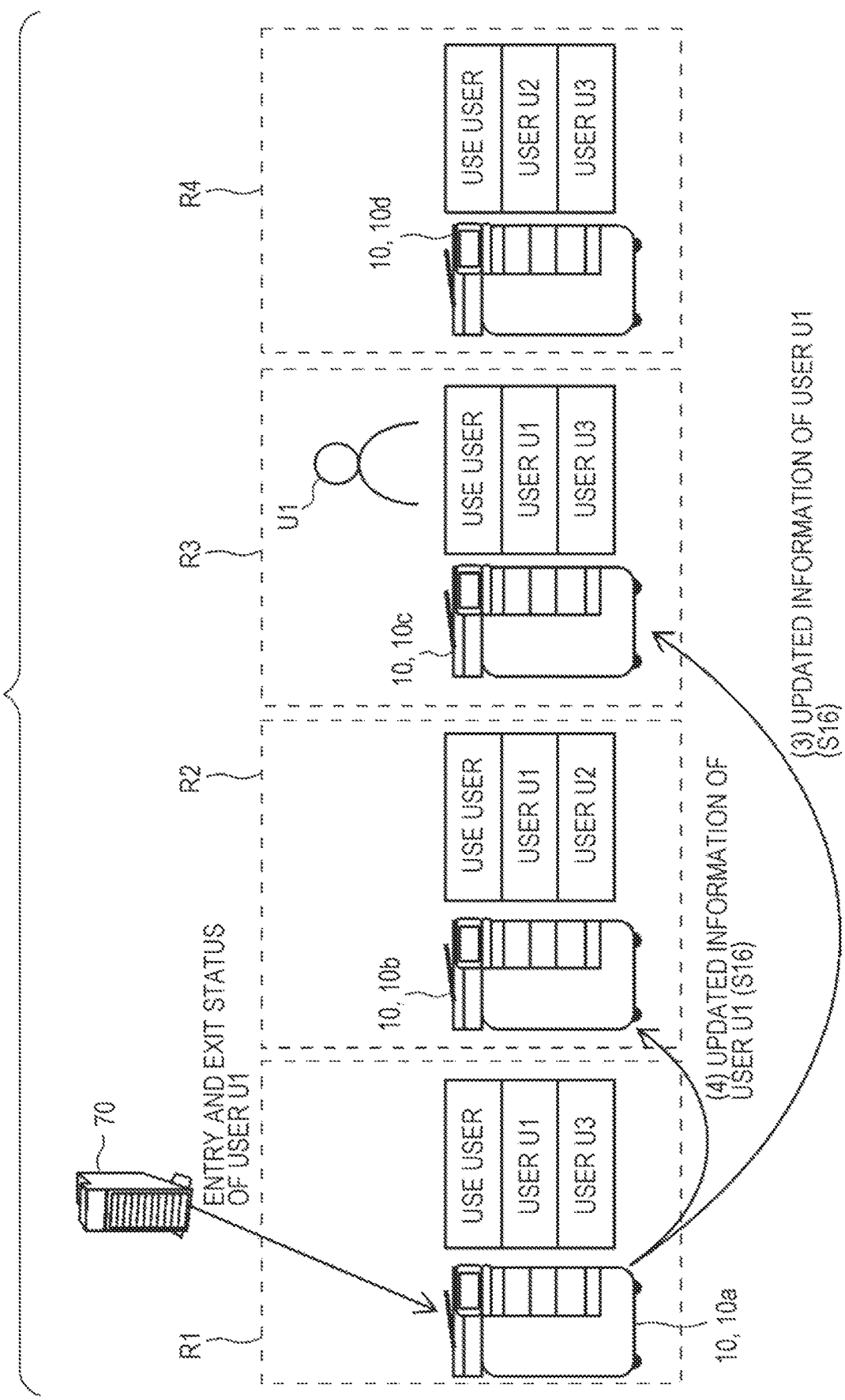
FIG. 8 is a diagram illustrating a status in which the specific user exists in an installation room of a certain apparatus already used.

For example, it is assumed that the distribution destination apparatus 10b is provided in a room R2 and the distribution destination apparatus 10c is provided in a room R3 (a room different from the room R2) (see FIG. 8). In transmission of the updated data of the update target user U1 to the plural distribution destination apparatuses 10b and 10c, the transfer apparatus 10a specifies a room where the update target user U1 exists in cooperation with an entry and exit management system or the like. Specifically, the transfer apparatus 10a acquires entry information that the user U1 exists (has entered) in the room R3 from an entry and exit management server 70 (FIG. 8), thereby specifying the room (here, the room R3) where the update target user U1 exists. Then, the transfer apparatus 10a transmits the updated data to an apparatus (here, the MFP 10c) provided in the room R3 (the room where the update target user U1 exists) among the plural distribution destination apparatuses 10b and 10c (preferentially) earlier than the apparatus (MFP 10b) provided in the room other than the room R3.

As described above, when there are the plural distribution destination apparatuses, the updated data of the update target user may be transmitted preferentially to the distribution destination apparatus provided in the room where the update target user exists. Note that, when there are the plural distribution destination apparatuses in the room where the update target user exists (or the room where no update target user exists), for example, as in the first embodiment, it is sufficient that the transmission of the updated data to the plural distribution destination apparatuses is executed in order from an apparatus having a larger number of times of use by the update target user among the plural distribution destination apparatuses.

2. Second Embodiment

A second embodiment is a modification of the first embodiment. Hereinafter, differences from the first embodiment will be mainly described.

In the first embodiment, transfer processing of updated data of a single update target user (for example, the user U1) is executed in one transfer apparatus (for example, the MFP 10a).

On the other hand, in the second embodiment, transfer processing of updated data of plural update target users (for example, users U1 and U3) is executed in one transfer apparatus.

Here, a user frequently using the MFP 10 in the information processing system 1 has a relatively high possibility of using any MFP 10 (apparatus already used) sooner than a user not frequently using the MFP 10. For that reason, when operation screen data of the both users have been updated in the management server 90, it is preferable that operation screen data of a user having a relatively high possibility of soon using any MFP 10 (apparatus already used) is preferentially updated in the apparatus already used.

Considering this point, in the second embodiment, when the transfer processing of the updated data of the plural update target users is executed in one transfer apparatus, transfer order is determined based on a total value (total number of times of use) of the numbers of times of use of respective plural MFPs 10a to 10d by each update target user. In other words, the total number of times of use by each user is evaluated based on the numbers of times of use of predetermined plural MFPs 10a to 10d (in other words, both the transfer apparatus and the distribution destination candidate apparatuses) by each user, and the transfer order of the updated data is determined based on the evaluation result. Note that, each of the MFPs 10a to 10d is also referred to as an evaluation target apparatus (or a calculation target apparatus) since it is an apparatus (MFP) to be an evaluation target of the total number of times of use (calculation target of the total number of times of use) by each user.

Hereinafter, the operation will be described below of the second embodiment.

Figure 11:
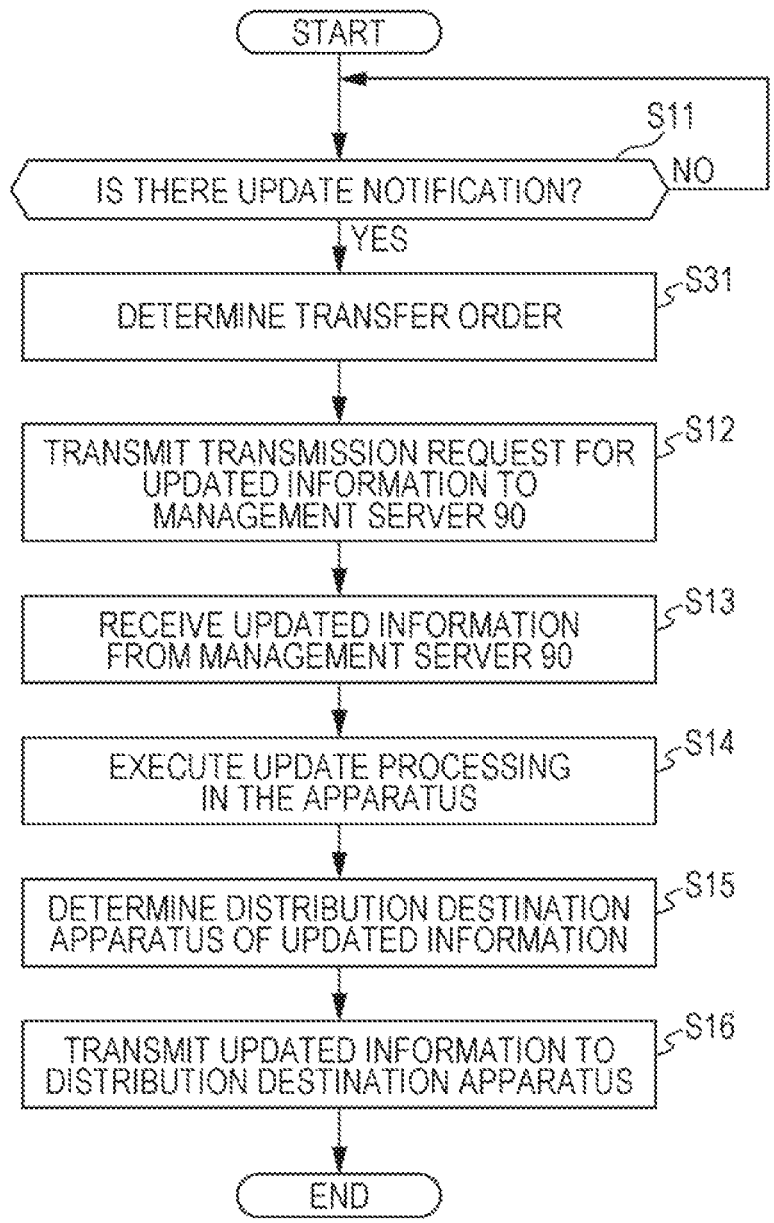
FIG. 11 is a flowchart illustrating operation of the MFP (transfer apparatus) according to the second embodiment.

FIG. 11 is a flowchart illustrating the operation of the MFP 10 (transfer apparatus) according to the second embodiment. As illustrated in FIG. 11, in the second embodiment, determination processing of the transfer order (step S31) is executed between step S11 and step S12.

Figure 9:
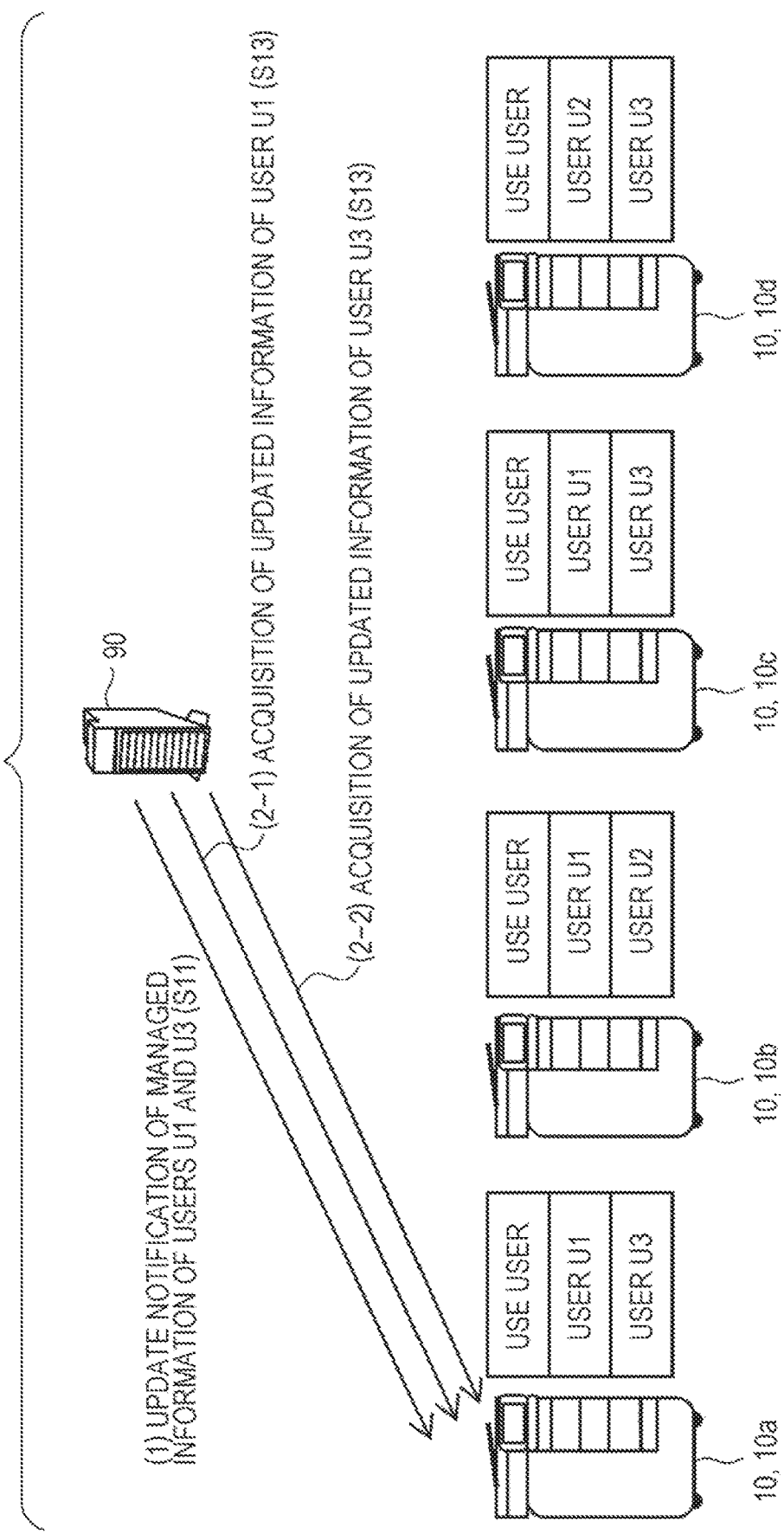
FIG. 9 is a conceptual diagram illustrating schematic operation of the information processing system according to a second embodiment.
Figure 10:
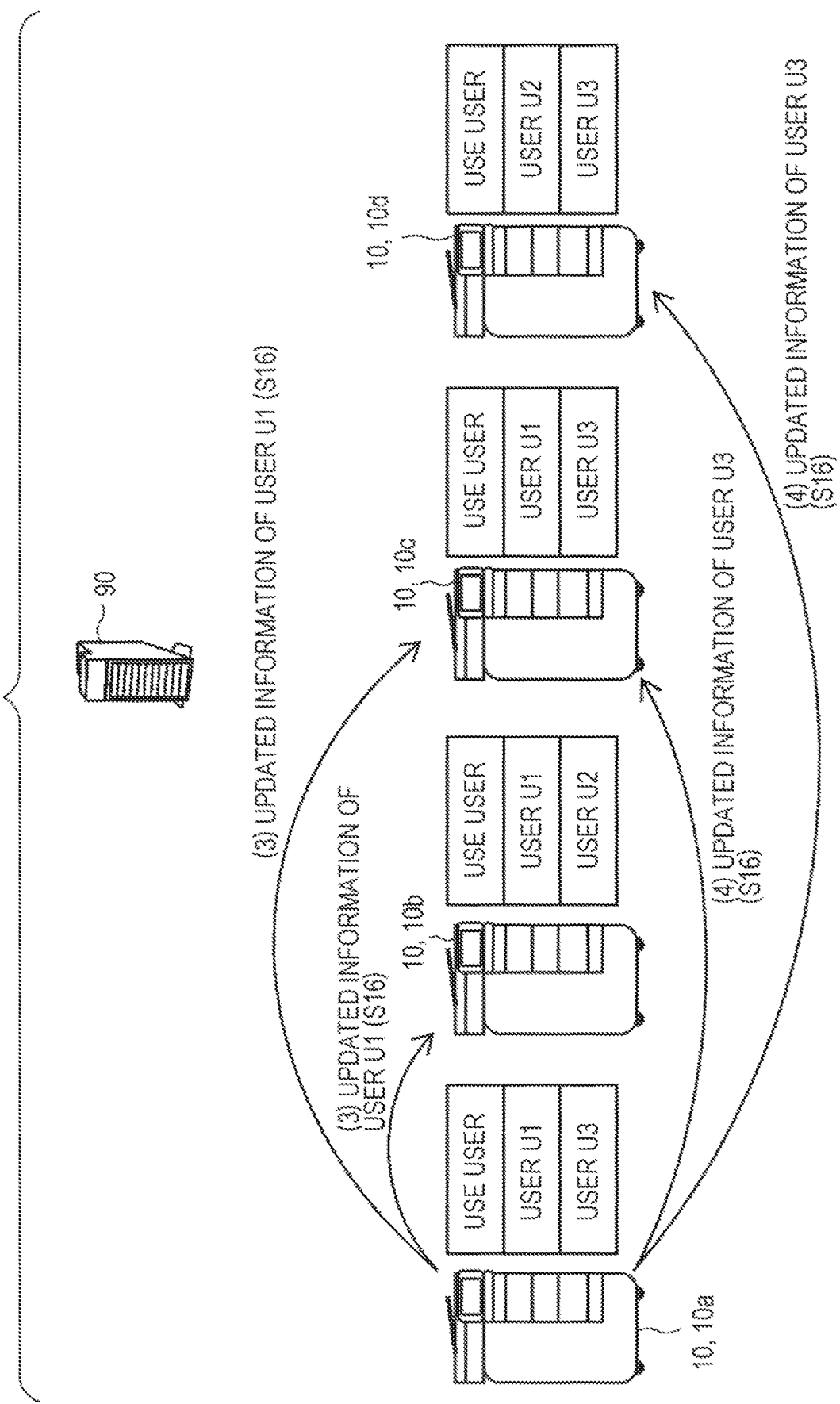
FIG. 10 is a conceptual diagram illustrating schematic operation of the information processing system according to the second embodiment.

FIGS. 9 and 10 are conceptual diagrams illustrating schematic operation of the information processing system 1 according to the second embodiment. Here, a case is assumed where each of operation screen data of the users U1 and U3 has been updated in the management server 90. Note that, the transfer apparatus for the updated data of the user U1 is the MFP 10a, and the transfer apparatus for the updated data of the user U3 is also the MFP 10a (see FIG. 5).

When deciding that the operation screen data of plural users (here, the users U1 and U3) have been updated in decision processing executed at a predetermined timing, the management server 90 transmits to the transfer apparatus (here, the MFP 10a) an update notification indicating that the operation screen data of the user U1 and the operation screen data of the user U3 have been updated by customization (see FIG. 9).

When receiving the update notification from the management server 90 (step S11), the transfer apparatus 10a causes the processing to proceed from step S11 to step S31 (see FIG. 11).

Then, in step S31, the transfer apparatus 10a determines the transfer order of the updated data of each update target user to the distribution destination apparatus.

Note that, here, as described later, the transfer apparatus 10a acquires from the management server 90 the updated data of each update target user in the same order as the transfer order determined in step S31 (step S13), and updates the operation screen data of the update target user in the transfer apparatus 10a (step S14). Then, the transfer apparatus 10a transfers the updated data of each update target user to the distribution destination apparatus in the transfer order determined in step S31 (step S16), and the operation screen data of the update target user is updated in the update destination apparatus. As described above, the transfer order of the updated data is also update order of the operation screen data of each update target user in both the transfer apparatus 10a (one MFP 10 having the use history of the update target user) and the distribution destination apparatus. For that reason, the total number of times of use by each update target user is evaluated including not only the distribution destination candidate apparatuses (the plural other MFPs 10b to 10d) but also the transfer apparatus (MFP 10a) itself in the evaluation target apparatuses.

Specifically, in step S31, the transfer apparatus 10a first calculates a total value (total number of times of use N10) of the numbers of times of use of the respective plural evaluation target apparatuses by the update target user U1, and a total value (total number of times of use N20) of the minters of times of use of the respective plural target apparatuses by the update target user U3.

More specifically, the transfer apparatus 10a inquires of each of the distribution destination candidate apparatuses the number of times of use of each of the distribution destination candidate apparatuses (here, the plural other MFPs 10b to 10d) by the users U1 and U3, and acquires each number of times of use. In addition, the transfer apparatus 10a acquires the numbers of times of use of the transfer apparatus 10a by the users U1 and U3, respectively.

Thereafter, based on the acquired number of times of use (the number of times of use of each of the evaluation target apparatuses 10a to 10d by each user), the transfer apparatus 10a calculates and acquires the total number of times of use N10 (here, N10=60 (see FIG. 12)) by the user U1, and the total number of times of use N20 (here, N20=15 (see FIG. 12)) by the user U3.

Then, the transfer apparatus 10a compares the total numbers of times of use N10 and N20 with each other, and determines the transfer order (execution order of the transfer processing) depending on the comparison result.

Specifically, the transfer order is determined so that the updated data, of each of the plural update target users is transferred to the distribution destination apparatus in order from the updated data of the user having a larger total number of times of use. For example, when the total number of times of use N10 (=60) by the update target user U1 is greater than the total number of times of use N20 (=15) by the update target user U3, the transfer order is determined so that the transfer processing of the updated data is executed in the order of the update target users U1 and U3. In other words, the transfer apparatus 10a determines that the updated data of the update target user U1 should be transferred to the distribution destination apparatuses (some apparatuses of the plural distribution destination candidate apparatuses) (preferentially) earlier than the updated data of the update target user U3.

Then, the processing proceeds from step S31 to step S12 and the subsequent steps, and the same operation as that in the first embodiment is executed. However, here, as described above, the updated data of each update target user is received from the management server 90 in the same order as the determined transfer order.

Specifically, in step S12, the transfer apparatus 10a transmits to the management server 90 a transmission request that the updated data should be transmitted in the order of the update target users U1 and U3 in accordance with the determined transfer order. In other words, the transfer apparatus 10a transmits to the management server 90 a transmission request that the updated data of the update target user U1 should be transmitted earlier than the updated data of the update target user U3.

In response to the transmission request from the transfer apparatus 10a, the management server 90 transmits the updated data of the update target user U1 to the transfer apparatus 10a, and then transmits the updated data of the update target user U3 to the transfer apparatus 10a (see FIG. 9). The transfer apparatus 10a receives the updated data of the update target user U1 from the management server 90, and then receives the updated data of the update target user U3 from the management server 90 (step S13).

Then, the transfer apparatus 10a executes update processing of the operation screen data of the user U1 in the transfer apparatus 10a, and after completing the update processing of the operation screen data of the update target user U1, executes the update processing of the operation screen data of the update target user U3 (step S14).

Thereafter, the transfer apparatus 10a determines the distribution destination apparatus of the updated data for each of the update target users U1 and U3 (step S15), and transmits the updated data to the distribution destination apparatus in accordance with the determined transfer order (step S16). Specifically, the transfer apparatus 10a determines the apparatuses already used (here, the MFPs 10b and 10c) by the update target user U1 as the distribution destination apparatuses of the updated data of the update target user U1 (step S15), and transmits (transfers) the updated data of the update target user U1 to the MFPs 10b and 10c (step S16) (see FIG. 10). In addition, the transfer apparatus 10a determines the apparatuses already used (here, the MFPs 10c and 10d) by the update target user U3 as the distribution destination apparatuses of the updated data of the update target user U3 (step S15), and after transferring the updated data of the update target user transmits (transfers) the updated data of the update target user U3 to the MFPs 10c and 10d (step S16) (see FIG. 10).

As described above, when the operation screen data of the plural users are updated in the management server 90 and the transfer processing of the updated data of the plural update target users is executed in one transfer apparatus (here, the MFP 10a), the transfer order is determined based on the total value (the total number of times of use) of the numbers of times of use of the respective plural evaluation target apparatuses by each update target user.

Note that, even in a case where the operation screen data of the plural users have been updated in the management server 90, when the transfer apparatuses for the updated data of the respective update target users are different apparatuses from each other, the same operation as that in the first embodiment is executed in each of the transfer apparatuses. For example, when the operation screen data of the user U1 and the operation screen data of the user U2 have been updated in the management server 90, the same operation as that in the first embodiment is executed in each of the MFP 10a (the transfer apparatus for the updated data of the user U1) and the MFP 10b (the transfer apparatus for the updated data of the user U2).

As described above, in the second embodiment, when the transfer processing of the updated data of the plural update target users (U1 and U3) is executed in the transfer apparatus, the transfer order is determined so that the updated data of each update target user is transferred in order (for example, in the order of the users U1 and U3) from the updated data of the user having a larger total number of times of use (step S31). In other words, the updated data of the user U1 frequently using the MFP 10 (evaluation target apparatus) in the information processing system 1 is transferred to the distribution destination apparatus earlier than the updated data of the user U3 not frequently using the MFP 10 (evaluation target apparatus). Therefore, it is possible to preferentially transmit, to the distribution destination apparatus, the updated data of the user U1 having a relatively high possibility of soon using any of the plural evaluation target apparatuses (here, the MFPs 10a to 10d). Consequently, the update processing of the operation screen data of the user U1 can be executed earlier than the update processing of the operation screen data of the user U3.

Modified Example of Second Embodiment

Modified Example on Determination of Transfer Order

In the second embodiment, when the transfer processing of the updated data of the plural update target users is executed in one transfer apparatus, the transfer order is determined based on the total number of times of use of each update target user (the total value of the numbers of times of use of the respective plural evaluation target apparatuses); however, this is not a limitation. For example, when the transfer processing of the updated data of the plural update target users is executed in one transfer apparatus, the transfer order may be determined based on the latest use time point (latest use time point among the most recent use time points of the respective plural evaluation target apparatuses) of each update target user.

Here, it is also conceivable that, among the plural update target users, a user having the newest latest use time point has relatively high possibility of soon using any of the MFPs 10 (apparatuses already used) earlier than the other users.

Considering this point, in this modified example, when the transfer processing of the updated data of the plural update target users is executed in one transfer apparatus, the transfer order is determined based on the latest use time point (the latest use time point among the most recent use time points of the respective plural MFPs 10a to 10d) of each update target user. In other words, the latest use time point of each user is evaluated based on the most recent use time point of the plural evaluation target apparatuses (predetermined plural MFPs 10a to 10d (in other words, both the transfer apparatus and the distribution destination candidate apparatuses)) by each user, and the transfer order is determined based on the evaluation result.

Specifically, first, when acquiring from the management server 90 an update notification that each operation screen data of the plural users (for example, the users U1 and U3) has been updated, the transfer apparatus acquires the latest use time point of each update target user. Here, the transfer apparatus 10a acquires the latest use time point (latest use time point T10) among the most recent use time points of the respective plural evaluation target apparatuses (here, MFPs 10a to 10d) by the update target user U1, and the latest use time point (latest use time point T20) among the most recent use time points of the respective plural evaluation target apparatuses by the update target user U3.

More specifically, the transfer apparatus 10a inquires of the distribution destination candidate apparatuses the most recent use time points of the respective distribution destination candidate apparatuses (here, the plural other MFPs 10b to 10d) by the users U1 and U3, to acquire the most recent use time points. In addition, the transfer apparatus 10a acquires the most recent use time point of the transfer apparatus 10a by each of the update target users U1 and U3. Then, based on the acquired most recent use time point (the most recent use time point of each MFP 10 by each user), the transfer apparatus 10a acquires the latest use time point T10 of the user U1 (here, T10=10:15 on Sep. 1, 2017 (see FIG. 13)) and the latest use time point T20 of the user U3 (here, T20=17:00 on Aug. 10, 2017 (see FIG. 13)).

Then, the transfer apparatus 10a compares the latest use time points T10 and T20 with each other, and determines the transfer order depending on the comparison result.

Specifically, the transfer order (reception order from the management server 90 and transfer order to the distribution destination apparatus) is determined so that the updated data of each of the plural update target users is transferred to the distribution destination apparatus in order from the updated data of a user having a newer latest use time point. For example, when the latest use time point T10 of the update target user U1 is newer (closer to the current time point) than the latest use time point T20 of the update target user U3, the transfer order is determined so that the transfer processing of the updated data is executed in the order of the update target users U1 and U3. In other words, the transfer apparatus 10a determines that the updated data of the update target user U1 should be transferred to the distribution destination apparatuses (some apparatuses of the plural distribution destination candidate apparatuses) (preferentially) earlier than the updated data of the update target user U3.

As described above, when the transfer processing of the updated data of the plural update target users is executed in the transfer apparatus, the transfer order may be determined based on the latest use time point (the latest use time point among the most recent use time points of the respective plural evaluation target apparatuses) of each update target user.

With this configuration, the same effects as those in the second embodiment can be obtained.

Modified Example on Change of Determined Transfer Order

In the second embodiment (or the above-described "modified example on determination of transfer order"), the transfer order determined based on the total number of times of use (or the latest use time point) may be further changed by cooperation with various management systems.

Specifically, for example, even in a case where it is determined that the updated data should be transferred in the order of the update target users U1 and U3, when a special circumstance (a circumstance where there is a low possibility that the evaluation target apparatus is used soon by the user U1) exists, the updated data of the user U3, not the user may be transmitted to the distribution destination apparatus earlier.

For example, the transfer order determined for the plural update target users may be changed in cooperation with an attendance management system.

Figure 14:
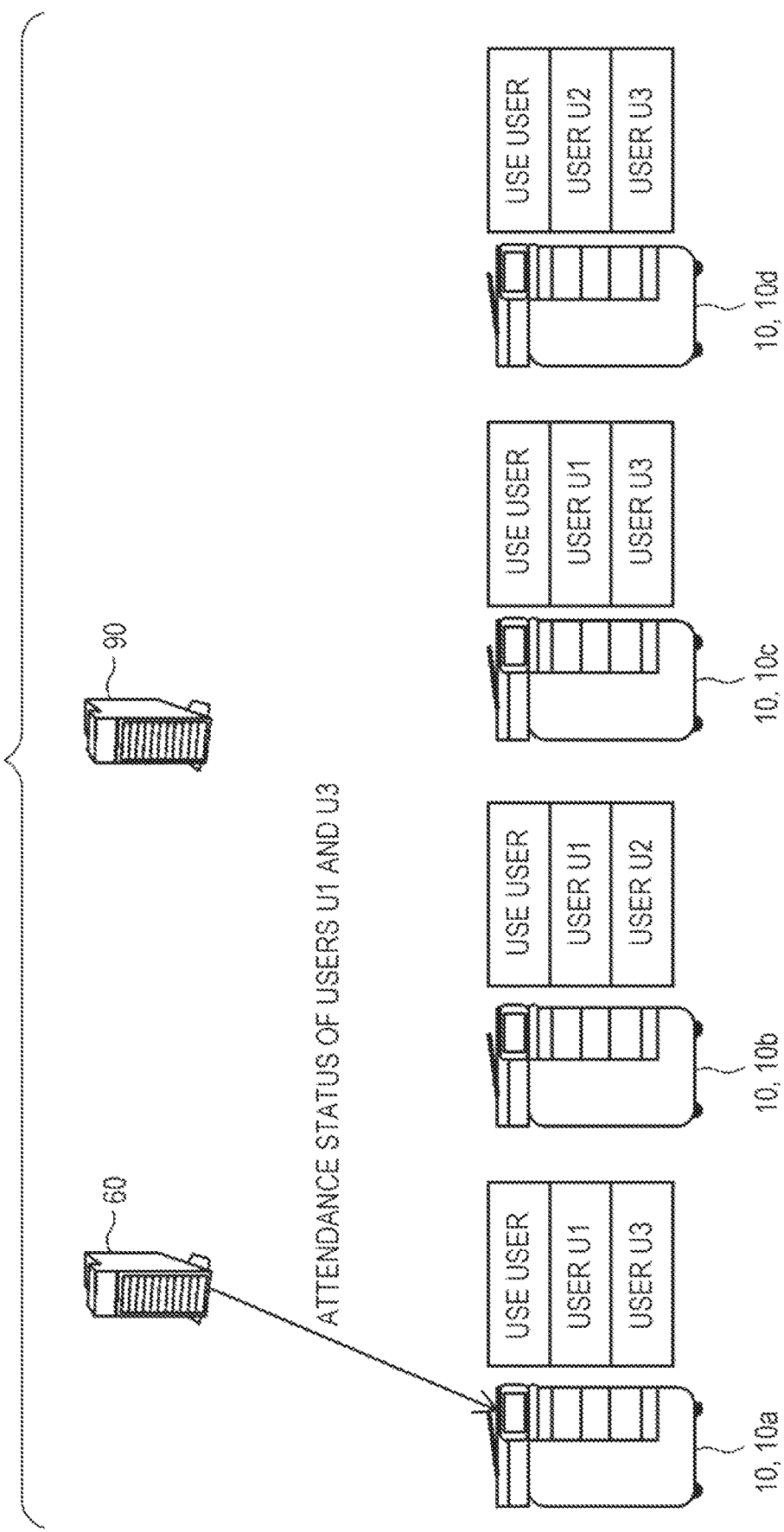
FIG. 14 is a conceptual diagram illustrating schematic operation on cooperation with an attendance management server.

Specifically, in determination of the distribution destination apparatus (step S15 (FIG. 11)), the transfer apparatus (for example, the MFP 10a) inquires of an attendance management server 60 (FIG. 14) an attendance status (attendance status to an office where the distribution destination apparatus is installed) of each of the update target users U1 and U3, to acquire the attendance status, and decides whether or not each of the update target users U1 and U3 is in the office.

Then, for example, in a case where it is determined that the updated data should be transferred in the order of the users U1 and U3, when it is decided that the user U1 is in the office, in step S31, the updated data of each update target user is transferred in the decided transfer order (in the order of the users U1 and U3).

On the other hand, even in the case where it is determined that the updated data should be transferred in the order of the users U1 and U3, when it is decided that the user U1 is not in the office, in step S31, the updated data of the user U3, not the user U1, is transferred to the distribution destination apparatus earlier. In detail, when the user U1 is not in the office, the possibility is low that the distribution destination apparatus is used soon by the user U1, and it is unnecessary to immediately update the operation screen data of the user U1 in the distribution destination apparatus. In such a case, the transfer processing of the updated data of the other update target user U3 is executed earlier than the transfer processing of the updated data of the update target user U1.

Note that, it is more preferable that the attendance status of the user U3 is also considered. Specifically, when it is decided that the user U1 is not in the office and the user U3 is in the office, the determined transfer order may be changed as described above. In other words, when it is decided that both the users U1 and U3 are not in the office, the determined transfer order does not have to be changed.

Alternatively, the transfer order determined for the plural update target users may be changed in cooperation with the entry and exit management system.

Figure 15:
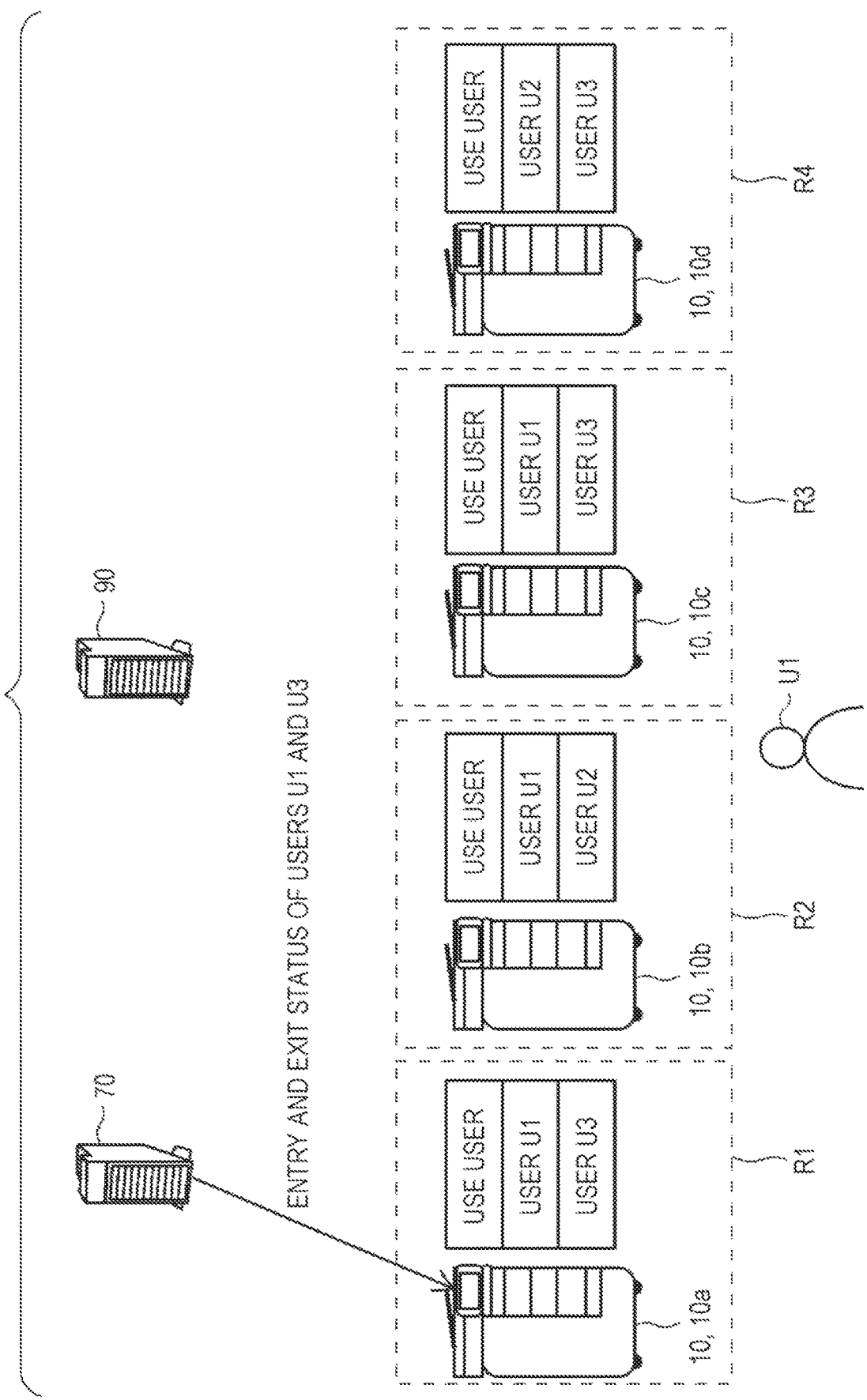
FIG. 15 is a conceptual diagram illustrating schematic operation on cooperation with an entry and exit management server.

Specifically, in determination of the distribution destination apparatus (step S15 (FIG. 11)), the transfer apparatus (for example, the MFP 10a) inquires of the entry and exit management server 70 (FIG. 15) an entry and exit status of each of the update target users U1 and U3, to acquire the entry and exit status, and decides whether or not each of the update target users U1 and U3 is in an installation room of the distribution destination apparatus (apparatus already used by each update target user).

Then, the example, in the case where it is determined that the updated data should be transferred in the order of the users U1 and U3, when it is decided that the user U1 is in any one of the installation rooms R2 and R3 of the respective distribution destination apparatuses 10b and 10c, in step 16, the updated data of each update target user is transferred in the determined transfer order (in the order of the users U1 and U3).

On the other hand, even in the case where it is determined that the updated data should be transferred in the order of the users U1 and U3, when it is decided that the user U1 is not in any of the installation rooms R2 and R3 of the respective distribution destination apparatuses 10b and 10c, in step S16, the updated data of the user U3, not the user U1, is transferred to the distribution destination apparatus earlier. In detail, when the user U1 is not in any of the installation rooms R2 and R3 of the respective distribution destination apparatuses 10b and 10c, the possibility is low that the distribution destination apparatuses 10b and 10c are used soon by the user U1, and it is unnecessary to immediately update the operation screen data of the user U1 in the distribution destination apparatuses 10b and 10c. In such a case, the transfer processing of the updated data of the other update target user U3 is executed earlier than the transfer processing of the updated data of the update target user U1.

Note that, it is more preferable that the entry and exit status of the user U3 is also considered. Specifically, when it is decided that the user U1 is not in any of the installation rooms R2 and R3 of the respective distribution destination apparatuses 10b and 10c of the updated data of the user U1, and the user U3 is in any one of the installation rooms R3 and R4 of the respective distribution destination apparatuses 10c and 10d of the updated data of the user U3, the determined transfer order may be changed as described above. In other words, when it is decided that both the users U1 and U3 are not in any of the installation rooms of the respective distribution destination apparatuses of the updated data of the users U1 and U3, the determined transfer order does not have to be changed.

In addition, the transfer order determined for the plural update target users may be changed in cooperation with a schedule management system.

Figure 16:
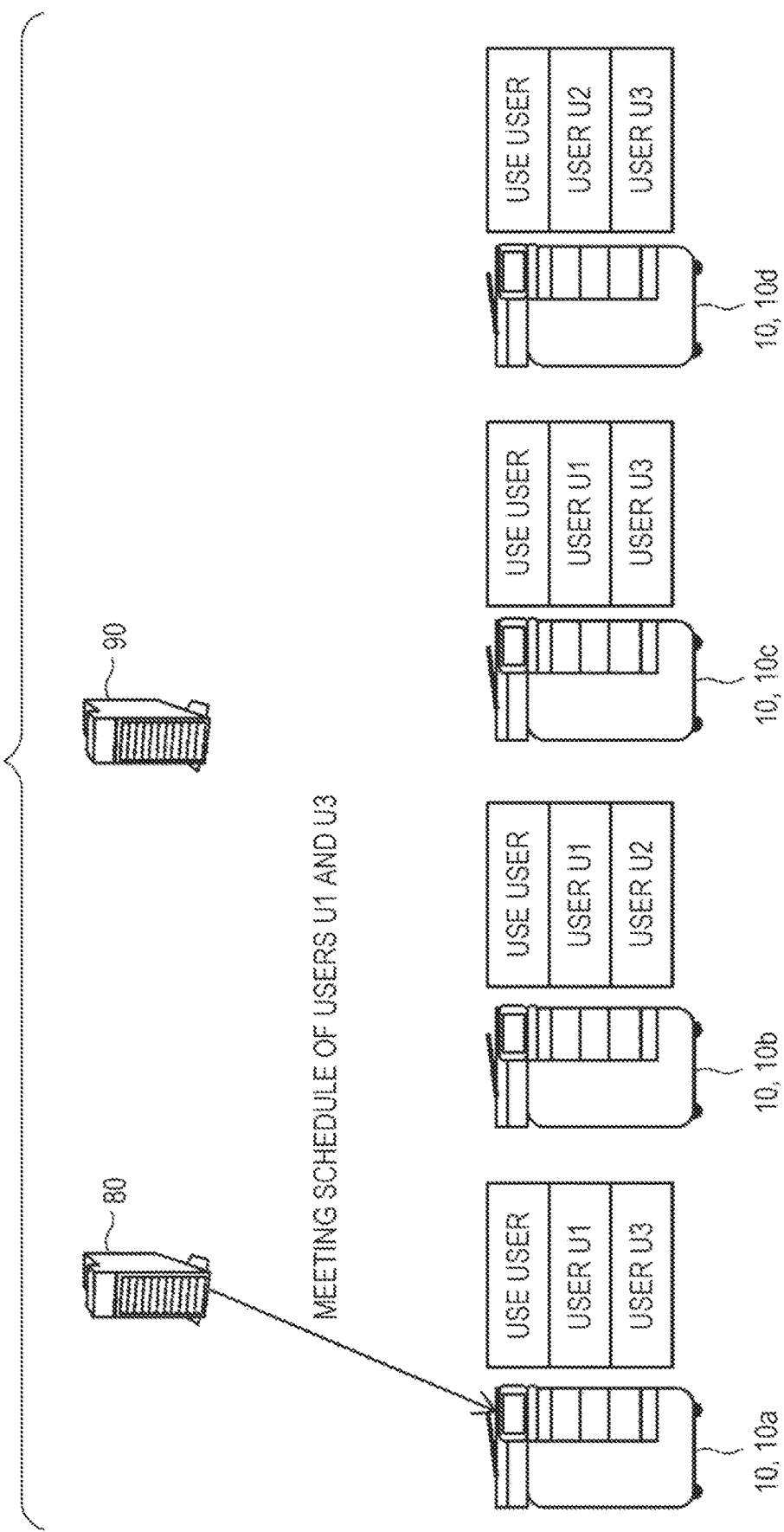
FIG. 16 is a conceptual diagram illustrating schematic operation on cooperation with a schedule management server.

Specifically, in determination of the distribution destination apparatus (step S15 (FIG. 11)), the transfer apparatus (for example, the MFP 10a) inquires of a schedule management server 80 (FIG. 16) a schedule (meeting schedule) of each of the update target users U1 and U3, to acquire the schedule, and decides whether or not each of the update target users U1 and U3 is in a meeting.

Then, for example, in the case where it is determined that the updated data should be transferred in the order of the users U1 and U3, when it is decided that the user U1 is not in a meeting, in step S16, the updated data of each update target user is transferred in the determined transfer order (in the order of the users U1 and U3).

On the other hand, even in the case where it is determined that the updated data should be transferred in the order of the users U1 and U3, when it is decided that the user U1 is in a meeting, in step S16, the updated data of user U3, not the user U1, is transferred to the distribution destination apparatus earlier. In detail, when the user U1 is in a meeting, the possibility is relatively low that the distribution destination apparatus is used soon by the user U1, and it is unnecessary to immediately update the operation screen data of the user U1 in the distribution destination apparatus. In such a case, the transfer processing of the updated data of the other update target user U3 is executed earlier than the transfer processing of the updated data of the update target user U1.

Note that, it is more preferable that the meeting schedule of the user U3 is also considered. Specifically, when it is decided that the user U1 is in a meeting and the user U3 is not in a meeting, the determined transfer order may be changed as described above. In other words, when it is decided that both the users U1 and U3 are in meetings, the determined transfer order does not have to be changed.

Further, the transfer order determined for the plural update target users may be changed in cooperation with both the entry and exit management system (entry and exit management server 70) and the schedule management system (schedule management server 80).

For example, even in the case where it is determined that the updated data should be transferred in the order of the users U1 and U3, when the user U1 is not in any of the installation rooms (R2 and R3) of the respective distribution destination apparatuses (apparatuses already used 10b and 10c by the user U1), the transfer order is changed, and the transfer processing of the updated data of each update target user is executed in the order of the users U3 and U1. On the other hand, in the case where it is determined that the updated data should be transferred in the order of the users U1 and U3, when the user U1 is in one of the installation rooms (R2 and R3) of the respective distribution destination apparatuses (apparatuses already used 10b and 10c by the user U1), the transfer processing of the updated data of each update target user is executed in the determined transfer order (in the order of the users U1 and U3). However, even in a case where the user U1 is in one of the installation rooms (R2 and R3) of the respective distribution destination apparatuses (apparatuses already used 10b and 10c by the user U1), when the user U1 is in a meeting (in any of the rooms R2 and R3), the transfer order is changed, and the transfer processing of the updated data of each update target user is executed in the order of the users U3 and U1. In other words, the transfer apparatus 10a executes the transfer processing of the updated data of each update target user in the order of the users U1 and U3 in accordance with the determined transfer order, on condition that the user U1 is in one of the installation rooms of the distribution destination apparatuses (apparatuses already used 10b and 10c by the user U1) and the user U1 is not in a meeting.

Note that, similarly, the transfer order determined for the plural update target users may be changed in cooperation with the attendance management system (attendance management server 60) and the schedule management system (schedule management server 80).

Modified Example on Evaluation Target Apparatus

Further, in the second embodiment (or the modified example of the second embodiment), in determination of the transfer order based on the total number of times of use (or the latest use time point), the transfer apparatus (for example, the MFP 10a) is included in the evaluation target apparatuses; however, this is not a limitation. For example, the transfer apparatus (for example, the MFP 10a) is not included in the evaluation target apparatuses, and the plural distribution destination candidate apparatuses (the MFPs 10 (10b to 10d) other than the transfer apparatus among the plural MFPs 10) may be the evaluation target apparatuses. Note that, in this case, the reception order of the updated data from the management server 90 in the transfer apparatus may be determined separately from the transfer order (for example, based on the number of times of use (or the most recent use time point) of the transfer apparatus by each update target user).

3. Third Embodiment

A third embodiment is a modification of the first embodiment. Hereinafter, differences from the first embodiment will be mainly described.

In the first embodiment, in response to acquisition of the update notification transmitted from the management server 90 to the transfer apparatus, the transfer apparatus receives the updated data of the specific user (update target user) from the management server 90 (see FIG. 3).

On the other hand, in the third embodiment, the update notification is not transmitted from the management server 90 to the transfer apparatus, and the transfer apparatus (spontaneously) inquires of the management server 90 presence or absence of update of the operation screen data of the specific user. Then, in response to acquisition of an inquiry result that the operation screen data of the specific user has been updated, the transfer apparatus receives the updated data of the specific user from the management server 90 (see FIG. 17).

Figure 17:
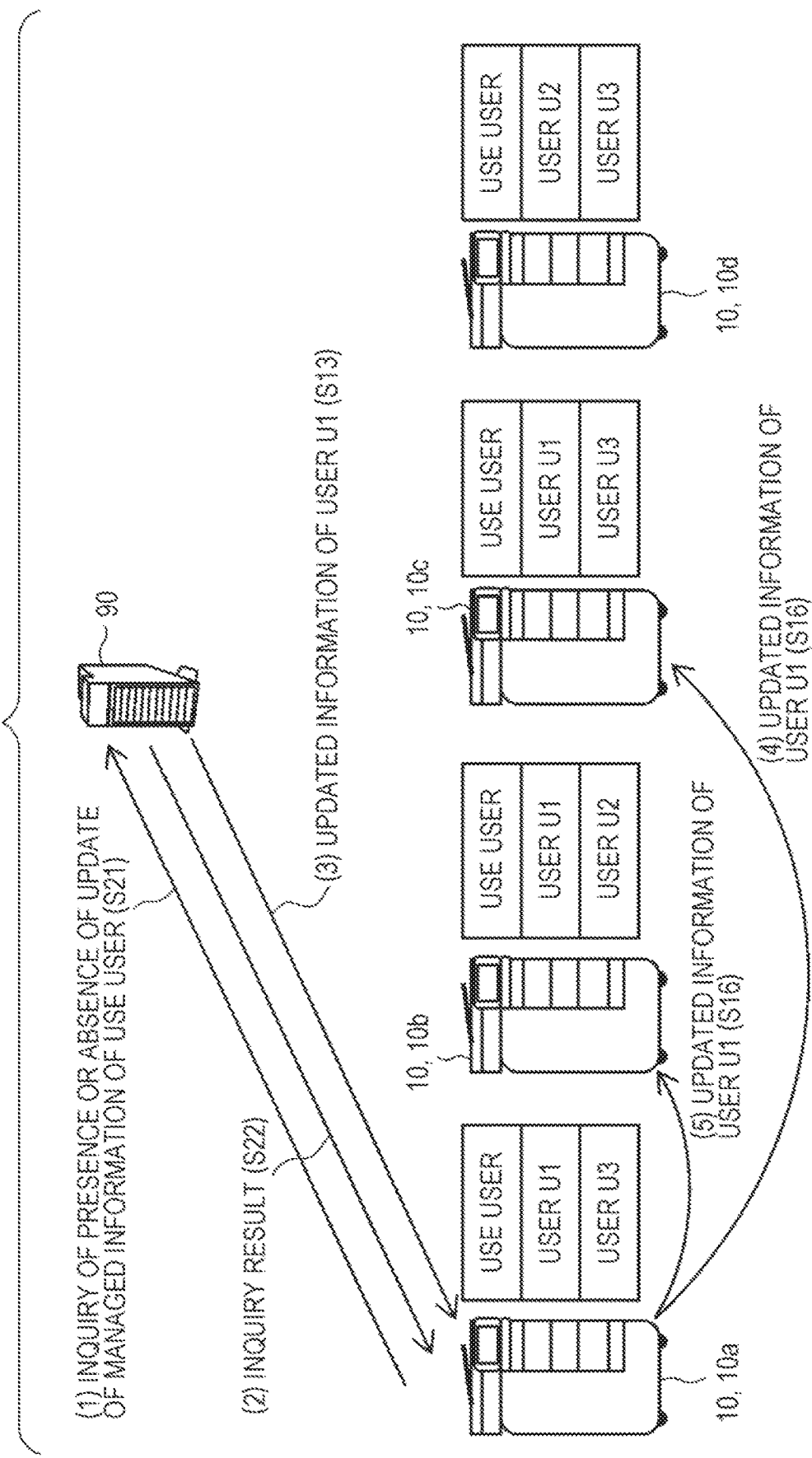
FIG. 17 is a conceptual diagram illustrating schematic operation of the information processing system according to a third embodiment.
Figure 18:
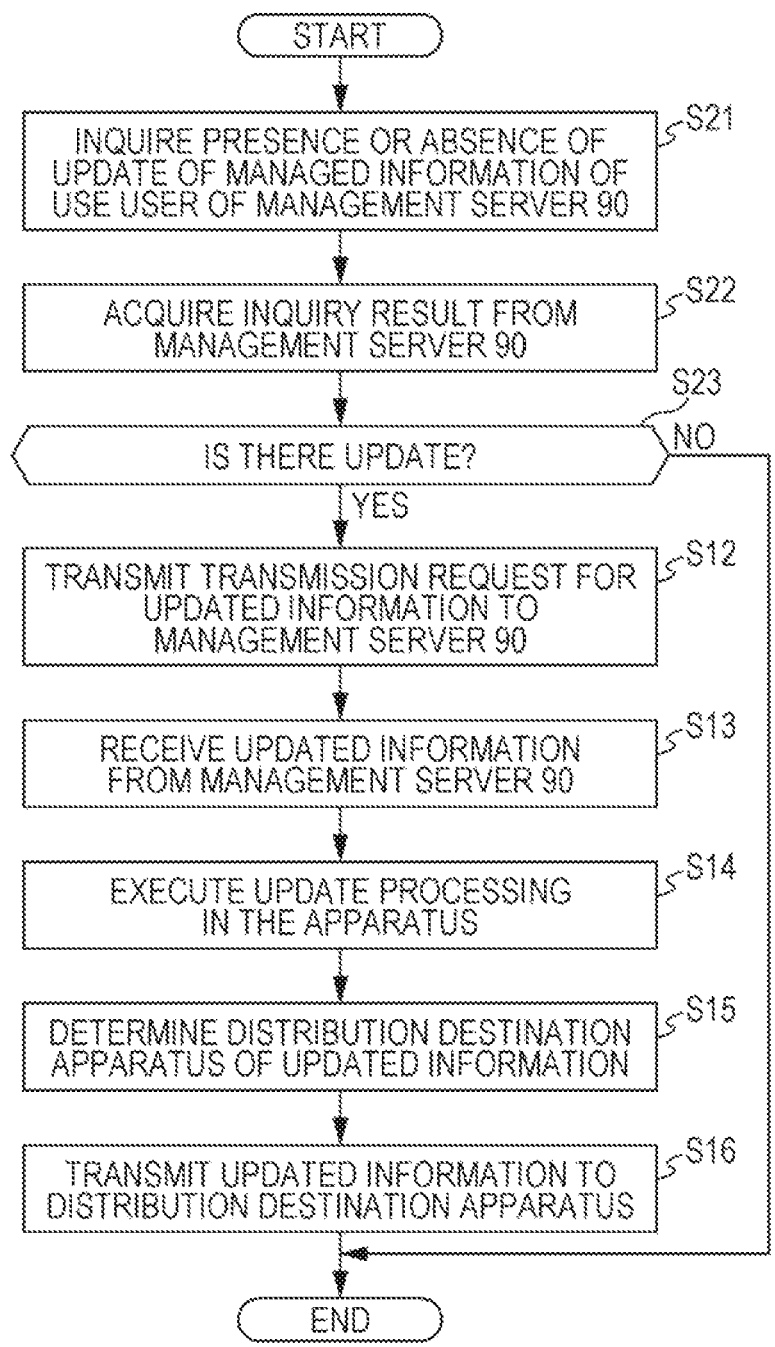
FIG. 18 is a flowchart illustrating operation of the MFP (transfer apparatus) according to the third embodiment.

FIG. 17 is a diagram illustrating schematic operation of the information processing system 1 according to the third embodiment. FIG. 18 is a flowchart illustrating the operation of the MFP 10 (transfer apparatus) according to the third embodiment. Here, the operation will be exemplified in the MFP 10a (transfer apparatus for the updated data of the user U1).

First, in step S21, the transfer apparatus (MFP 10a) inquires of the management server 90 presence or absence of update of the operation screen data of users (here, use users U1 and U3) each having a use history of the transfer apparatus 10a, at a predetermined timing (predetermined update check timing) (see FIG. 17). For example, in response to arrival of a predetermined scheduled inquiry time (12:00, or the like), the transfer apparatus 10a inquires of the management server 90 presence or absence of update of the operation screen data of the use users U1 and U3 (see FIG. 17). However, this is not a limitation, and presence or absence of update of the operation screen data of the use user may be inquired in response to arrival of the power-on time point of the transfer apparatus (transition time point from the power-off state to the power-on state). Alternatively, during a period in which the transfer apparatus is in the sleep state, presence or absence of update of the operation screen data of the use user may be inquired. Note that, even in a case where the transfer apparatus (some processing devices among plural processing devices of the transfer apparatus) is in the sleep state, it is assumed that the communication device 4 (FIG. 2) of the transfer apparatus is in the normal state and can execute data exchange with the management server 90. In this case, the transfer apparatus returns from the sleep state to the normal state in decision processing and the like of step S23 described later, and executes the processing of step S12 and the subsequent steps.

Here, when use histories of plural users exist in the transfer apparatus, the transfer apparatus determines inquiry order to the management server 90, and inquires of tire management server 90 presence or absence of update of the operation screen data of each user in accordance with the inquiry order. The determination of the inquiry order will be described in detail later. Here, the operation will be described of a case where presence or absence of update of the operation screen data of one use user (user U1) is inquired of the management server 90.

In response to the inquiry from the transfer apparatus 10a, the management server 90 decides presence or absence of update of the operation screen data of a designated user (here, the user U1). Here, the management server 90 decides that the operation screen data of the user U1 has been updated. Then, the management server 90 transmits the inquiry result to the transfer apparatus 10a (inquiry source MFP 10) (see FIG. 17).

The transfer apparatus 10a, when acquiring the inquiry result from the management server 90 as update execution information (step S22), decides presence or absence of update (necessity of update) of the operation screen data of the use user (here, the user U1) based on the inquiry result (step S23).

Here, the inquiry result that the operation screen data of the user U1 has been updated by customization is acquired from the management server 90, and the processing proceeds from step S23 to step S12 and the subsequent steps. Note that, when an inquiry result that the operation screen data of the user U1 has not been updated is acquired from the management server 90, the processing ends of the flowchart of FIG. 18.

The processing in steps S12 to S16 is the same as in the first embodiment. Specifically, the transfer apparatus 10a transmits a transmission request for the updated data of the update target user U1 to the management server 90 (step S12), and acquires the updated data from the management server 90 (step S13). Then, the transfer apparatus 10a executes update processing of the operation screen data of the update target user U1 in the transfer apparatus 10a (step S14). Thereafter, the transfer apparatus 10a determines the distribution destination apparatus of the updated data of the update target user U1 (step S15) and automatically transmits the updated data to the MFP 10 determined as the distribution destination apparatus (step S16).

In this way, in response to acquisition of the inquiry result that the operation screen data of the user (here, the use user U1) having the use history of the transfer apparatus (MFP 10a) has been updated, the transfer apparatus (MFP 10a) receives the updated data of the use user (update target user) from the management server 90.

With this configuration, the same effects as those in the first embodiment can be obtained.

Description will be made below for the inquiry order (order of an inquiry about presence or absence of update of the operation screen data) to the management server 90 when the use histories of the plural users exist in the transfer apparatus (for example, the MFP 10a).

When the use histories of the plural users (for example, the use users U1 and U3) exist in the transfer apparatus (for example, the MFP 10a), in step S21 (FIG. 18), the transfer apparatus (MFP 10a) determines the inquiry order to the management server 90, based on the number of times of use (number of times of login) of the transfer apparatus (10a) by each user (each use user).

Specifically, the transfer apparatus 10a acquires the number of times of use N1 (here, N1=30 (FIG. 12)) of the transfer apparatus 10a by the use user U1, and the number of times of use N2 (here, N2=5 (FIG. 12)) of the transfer apparatus 10a by the use user U3. Then, the transfer apparatus 10a compares the number of times of use N1 with the number of times of use N2, and determines the inquiry order to the management server 90.

More specifically, the inquiry order (order of the inquiry about presence or absence of update of the operation screen data) is determined so that the inquiry about presence or absence of update of the operation screen data of each use user is performed in order from a user having a larger number of times of use of the transfer apparatus 10a. Here, the number of times of use N1 (=30) of the transfer apparatus 10a by the use user U1 is larger than the number of times of use N2 (=5) of the transfer apparatus 10a by the use user U3. In this case, the transfer apparatus 10a determines that presence or absence of update of the operation screen data of the use user U1 should be inquired of the management server 90 earlier than presence or absence of update of the operation screen data of the use user U3. Note that, here, the inquiry order is determined based on the number of times of use of the transfer apparatus 10a by each of use users U1 and U3; however, this is not a limitation, and the inquiry order may be determined based on the total numbers of times of use N10 and N20 (total value of the numbers of times of use of the respective plural evaluation target apparatuses) of each of use users U1 and U3.

Then, the transfer apparatus 10a inquires of the management server 90 presence or absence of update of the operation screen data of each use user in accordance with the determined inquiry order (here, in the order of the use users U1 and U3) (step S21). In response to the inquiry from the transfer apparatus 10a, in the order of the users U1 and U3, the management server 90 decides presence or absence of update of the operation screen data and transmits the inquiry result to the transfer apparatus 10a.

Thereafter, in the order of the use users U1 and U3, the transfer apparatus 10a acquires the inquiry result from the management server 90 (step S22), and decides presence or absence of update of the operation screen data (necessity of update) (step S23).

Here, an inquiry result is acquired that the operation screen data of the use user U1 has been updated and the operation screen data of the use user U3 has not been updated, from the management server 90. In this case, regarding the use user U1, it is decided in step S23 that the operation screen data has been updated, and the processing proceeds from step S23 to step S12 and the subsequent steps. Regarding the use user U3, it is decided in step S23 that the operation screen data has not been updated, and the processing ends of the flowchart of FIG. 18.

Note that, when an inquiry result is acquired that the operation screen data of both of the use users U1 and U3 have been updated, the transfer order is determined for each update target user (here, the use users U1 and U3) similarly to the second embodiment (or the modified example of the second embodiment), for example.

As described above, when the use histories of the plural users (U1 and U3) exist in the MFP 10 (for example, the MFP 10*a*), the inquiry order is determined so that the inquiry about presence or absence of update of the operation screen data of each use user is performed in order from the user having a larger number of times of use of the MFP 10*a* (the user having higher frequency of use of the MFP 10*a*) (for example, in the order of the users U1 and U3). Therefore, it is possible to preferentially inquire presence or absence of update of the operation screen data of the user U1 having a relatively high possibility of soon using the MFP 10*a* (transfer apparatus). Consequently, if the operation screen data of the user U1 having a relatively high possibility of soon using the transfer apparatus 10*a* has been updated by the management server 90, the updated data of the user U1 can be soon acquired (acquired and updated).

Modified Example of Third Embodiment

Modified Example on Determination of Inquiry Order

In the third embodiment, when the use histories of the plural users exist in the transfer apparatus, the inquiry order of presence or absence of update of the operation screen data of each use user is determined based on the number of times of use of the transfer apparatus by each use user; however, this is not a limitation. For example, when the use histories of the plural users exist in the transfer apparatus, the inquiry order of presence or absence of update of the operation screen data of each use user may be determined based on the most recent use time point of the transfer apparatus by each use user.

Specifically, the transfer apparatus (for example, the MFP 10*a*), when inquiring of the management server 90 presence or absence of update of the operation screen data of the use users U1 and U3 of the transfer apparatus 10*a* (step S21), acquires the most recent use time point of the transfer apparatus 10*a* by each of the use users U1 and U3. Here, a most recent use time point T1 of the transfer apparatus 10*a* by the use user U1 is 10:15 on Sep. 1, 2017, and a most recent use time point T2 of the transfer apparatus 10*a* by the use user U3 is 11:20 on Jul. 25, 2017 (see FIG. 13).

Then, the transfer apparatus 10*a* compares the most recent use time points T1 and T2 of the respective use users U1 and U3 with each other, and determines the inquiry order of presence or absence of update of the operation screen data of the use users U1 and U3. Specifically, the inquiry order is determined so that the inquiry about presence or absence of update of the operation screen data of each use user is performed in order from a user having a newer most recent use time point of the transfer apparatus 10*a*. Here, the most recent use time point T1 (=10:15 on Sep. 1, 2017) of the transfer apparatus 10*a* by the use user U1 is newer than the most recent use time point T2 (=11:20 on Jul. 25, 2017) of the transfer apparatus 10*a* by the use user U3. For that reason, the transfer apparatus 10*a* determines that presence or absence of update of the operation screen data of the use user U1 should be inquired of the management server 90 earlier than presence or absence of update of the operation screen data of the use user U3. Note that, here, the inquiry order is determined based on the most recent use time point of the transfer apparatus 10*a* by each of the use users U1 and U3; however, this is not a limitation, and the inquiry order may be determined based on the most recent use time points T10 and T20 (the latest use time point among the most recent use time points of the respective plural distribution destination candidate apparatuses) of each of the use users U1 and U3.

As described above, the inquiry order of presence or absence of update of the operation screen data of each use user may be determined based on the most recent use time point of the transfer apparatus by each use user.

With this configuration, the same effects as those in the third embodiment can be obtained.

Modified Example on Change of Determined Inquiry Order

In the third embodiment (or the above-described "modified example on determination of inquiry/order"), further, the inquiry order determined based on the number of times of use (or most recent use time point) may be changed by cooperation with various management systems.

Specifically, for example, in the transfer apparatus 10*a*, even in a case where it is determined that presence or absence of update of the operation screen data should be inquired in the order of the use user U1 and U3, when a circumstance exists in which the possibility is low that the transfer apparatus 10*a* is used soon by the user U1, presence or absence of update of the operation screen of user U3, not the user U1, may be inquired earlier.

For example, the inquiry order determined for the plural use users may be changed in cooperation with the attendance management system.

Specifically, in determination of the inquiry order, the transfer apparatus (for example, the MFP 10*a*) inquires of the attendance management server 60 (FIG. 14) an attendance status (attendance status to an office where the transfer apparatus 10*a* is installed) of each of the use users U1 and U3, to acquire the attendance status, and decides whether or not each of use users U1 and U3 is in the office.

Then, for example, in a case where it is determined that presence or absence of update of the operation screen data should be inquired in the order of the users U1 and U3, when it is decided that the user U1 is in the office, presence or absence of update of the operation screen data is inquired in the order of the users U1 and U3, which is the determined inquiry order.

On the other hand, even in the case where it is determined that presence or absence of update of the operation screen data should be inquired in tire order of the users U1 and U3, when it is decided that the user U1 is not in the office, presence or absence of update of the operation screen data of the user U3, not the user U1, is inquired of the management server 90 earlier. In detail, when the user U1 is not in the office, the possibility is low that the transfer apparatus 10*a* is used soon by the user U1, and it is unnecessary to immediately update the operation screen data of the user U1 in the transfer apparatus 10*a*. In such a case, the inquiry about presence or absence of update of the operation screen data of the other use user U3 is executed earlier than the inquiry about presence or absence of update of the operation screen data of the use user U1.

Note that, it is more preferable that the attendance status of the user U3 is also considered. Specifically, when it is decided that the user U1 is not in the office and the user U3 is in the office, the determined inquiry order may be changed as described above. In other words, when it is decided that both the users U1 and U3 are not in the office, the determined inquiry order does not have to be changed.

Alternatively, the inquiry order determined for the plural use users may be changed in cooperation with the entry and exit management system.

Specifically, in determination of the inquiry order, the transfer apparatus (MFP 10a) inquires of the entry and exit management server 70 (FIG. 15) an entry and exit status of each of the use users U1 and U3, to acquire the entry and exit status, and decides whether or not each of the use users U1 and U3 is in the installation room (R1) of the transfer apparatus (10a).

Then for example, in the case where it is determined that presence or absence of update of the operation screen data should be inquired in the order of the users U1 and U3, when it is decided that the user U1 is (has entered) in the installation room R1 of the transfer apparatus 10a, presence or absence of update of the operation screen data is inquired in the order of the users U1 and U3, which is the determined inquiry order.

On the other hand, even in the case where it is determined that presence or absence of update of the operation screen data should be inquired in the order of the users U1 and U3, when it is decided that the user U1 is not in the installation room R1 of the transfer apparatus 10a, presence or absence of update of the operation screen data of the user U3, not the user U1, is inquired of the management server 90 earlier. In detail, when the user U1 is not in the installation room R1 of the transfer apparatus 10a, the possibility is relatively low that the transfer apparatus 10a is used soon by the user U1, and it is unnecessary to immediately update the operation screen data of the user U1 in the transfer apparatus 10a. In such a case, the inquiry about presence or absence of update of the operation screen data of the other use user U3 is executed earlier than the inquiry about presence or absence of update of the operation screen data of the use user U1.

Note that, it is more preferable that the entry and exit status of the user U3 is also considered. Specifically, when it is decided that the user U1 is not in the installation room R1 of the transfer apparatus 10a and the user U3 is in the installation room R1 of the transfer apparatus 10a, the determined inquiry order may be changed as described above. In other words, when it is decided that both the users U1 and U3 are not in the installation room R1 of the transfer apparatus 10a, the determined inquiry order does not have to be changed.

In addition, the inquiry order determined for the plural use users may be changed in cooperation with the schedule management system.

Specifically, in determination of the inquiry order, the transfer apparatus (MFP 10a) inquires of the schedule management server 80 (FIG. 16) a schedule (meeting schedule) of each of the use users U1 and U3, to acquire the schedule (meeting schedule), and decides whether or not each of the use users U1 and U3 is in a meeting.

Then, for example, in the case where it is determined that presence or absence of update of the operation screen data should be inquired, in the order of the users U1 and U3, when it is decided that the user U1 is not in a meeting, presence or absence of update of the operation screen data is inquired in the order of the users U1 and U3, which is the determined inquiry order.

On the other hand, even in the case where it is determined that presence or absence of update of the operation screen data should be inquired in the order of the users U1 and U3, when it is decided that the user U1 is in a meeting, presence or absence of update of the operation screen data of the user U3, not the user U1, is inquired of the management server 90 earlier. In detail, when the user U1 is in a meeting, the possibility is relatively low that the transfer apparatus 10a is used soon by the user U1, and it is unnecessary to immediately update the operation screen data of the user U1 in the transfer apparatus 10a. In such a case, the inquiry about presence or absence of update of the operation screen data of the other use user U3 is executed earlier than the inquiry about presence or absence of update of the operation screen data of the use user U1.

Note that, it is more preferable that the meeting schedule of the user U3 is also considered. Specifically, when it is decided that the user U1 is in a meeting and the user U3 is not in a meeting, the determined inquiry order may be changed as described above. In other words, when it is decided that both the users U1 and U3 are in meetings, the determined inquiry order does not have to be changed.

Further, the inquiry order determined for the plural use users may be changed in cooperation with both the entry and exit management system (entry and exit management server 70) and the schedule management system (schedule management server 80).

For example, even in the case where it is determined that presence or absence of update of the operation screen data should be inquired in the order of the users U1 and U3, when the user U1 is not in the installation room R1 of the transfer apparatus 10a, the inquiry order is changed, and presence or absence of update of the operation screen data is inquired of the management server 90 in the order of the users U3 and U1. On the other hand, in the case where it is determined that presence or absence of update of the operation screen data should be inquired in the order of the users U1 and U3, when the user U1 is in the installation room R1 of the transfer apparatus 10a, presence or absence of update of the operation screen data is inquired in the order of the users U1 and U3, which is the determined inquiry order. However, even in a case where the user U1 is in the installation room R1 of the transfer apparatus 10a, when the user U1 is in a meeting (in the installation room R1), the inquiry order is changed, and presence or absence of update of the operation screen data is inquired of the management server 90 in the order of the users U3 and U1. In other words, the transfer apparatus 10a inquires presence or absence of update of the operation screen data in the order of the users U1 and U3 in accordance with the determined inquiry order, on condition that the user U1 is in the installation room R1 of the transfer apparatus 10a and the user U1 is not in a meeting.

Note that, similarly, the inquiry order determined for the plural use users may be changed in cooperation with the attendance management system (attendance management server 60) and the schedule management system (schedule management server 80).

4. Modifications

The embodiments of the present invention have been described above; however, the present invention is not limited to the above embodiments.

Modification on Transmission Condition of Updated Data

For example, in the above-described embodiments, the updated data of the specific user is uniformly transmitted to all the MFPs 10 determined as the distribution destination apparatuses in step S15 (FIG. 4 and the like); however, this is not a limitation, and the updated data does not have to be transmitted to an apparatus having the updated data of the specific user among all the MFPs 10 determined as the distribution destination apparatuses.

Figure 19:
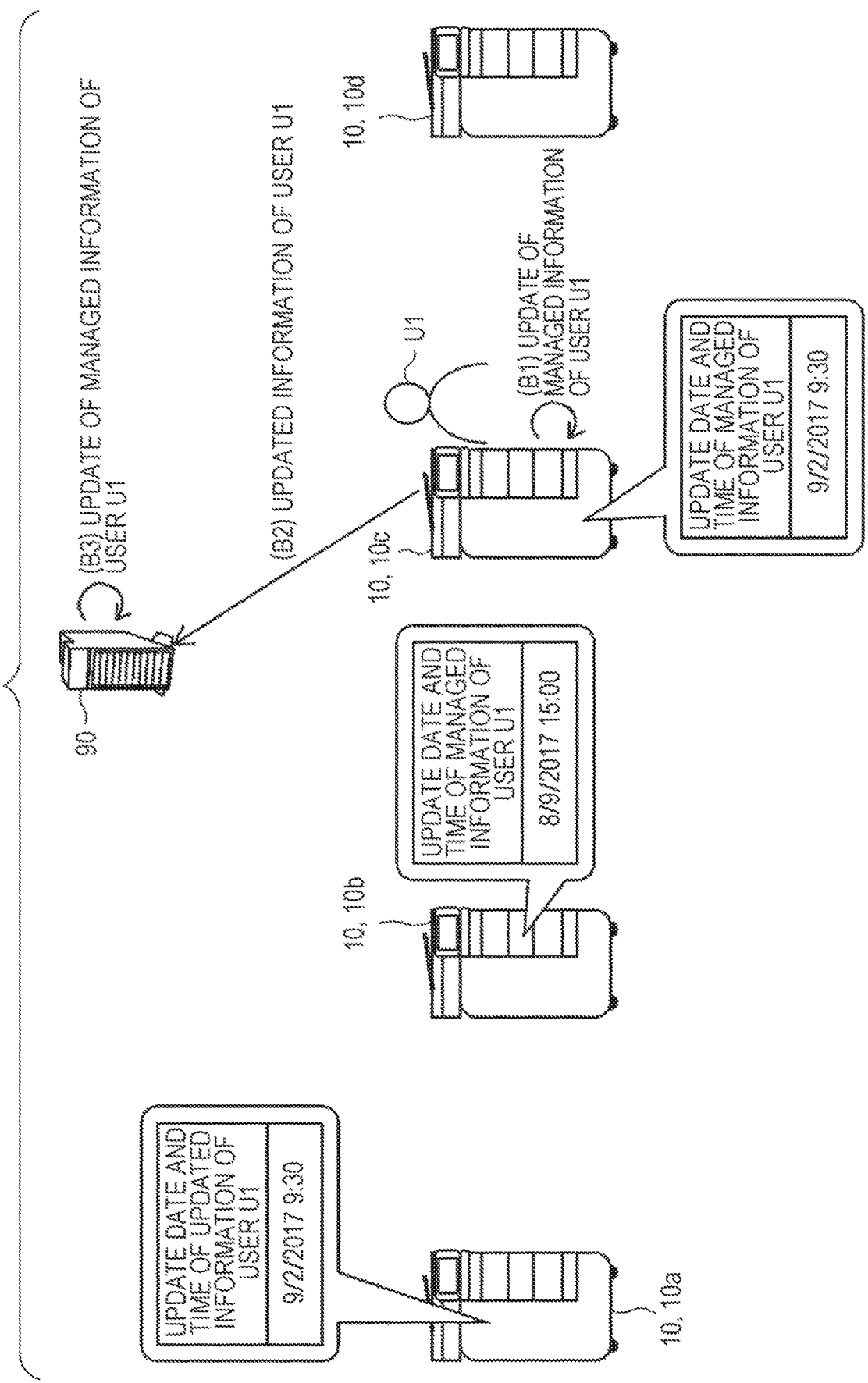
FIG. 19 is a conceptual diagram illustrating schematic operation of the information processing system according to a modification.

FIG. 19 is a conceptual diagram illustrating schematic operation of the information processing system according to tins modified example.

Here, a case is assumed where the user U1 has performed, in the MFP 10c, customizing operation to customize the operation screen for the user U1 at a certain time point Ta (for example, 9:30 on Sep. 2, 2017) before the processing in steps S12 to S16 in FIG. 4 (or the processing in FIG. 18) in the transfer apparatus (for example, MFP 10a). Note that, it is assumed that a current time point Tb (execution time point of transfer processing (step S16) of the updated data of the user U1) is 12:00 on Sep. 2, 2017 (Tb>Ta).

In response to the customizing operation at the certain time point Ta, the MFP 10c stores new operation screen data (updated operation screen data) in the MFP 10c and transmits the operation screen data to the management server 90. Then, in the management server 90, the operation screen data of the user U1 is updated and the updated operation screen data is stored (see FIG. 19). As a result, the operation screen data (operation screen data of the user U1) (updated data) having the update date and time, 9:30 on Sep. 2, 2017, is stored in both the MFP 10c and the management server 90.

Thereafter, the same operation as in the first embodiment (or the third embodiment) is executed in the transfer apparatus (for example, the MFP 10a) for the updated data, and at the current time point Tb, the updated data is transferred to the MFP 10 determined as the distribution destination apparatus in step S15 (step S16 (FIG. 4 (or FIG. 18)).

However, in this modified example, although the MFP 10c is determined as the distribution destination apparatus of the update target user U1 (step S15), as described later, the transfer apparatus 10a for the updated data of the update target user U1 does not transmit the updated data acquired from the management server 90 to the MFP 10c.

Specifically, in transmission of the updated data to the MFPs 10 (here, the apparatuses already used 10b and 10c by the update target user U1) determined as the distribution destination apparatuses (step S16), the transfer apparatus 10a inquires of the distribution destination apparatus update date and time (time stamp) of the operation screen data of the update target user U1 in the distribution destination apparatus, to acquire the update date and time.

Then, based on the update date and time of the updated data received from the management server 90 in step S13 (FIG. 4 and the like) and the update date and time acquired from the distribution destination apparatus, the transfer apparatus 10a decides presence or absence of the updated data (operation screen data having the same update date and time as the update date and time of the updated data) of the update target user U1 in the distribution destination apparatus. Note that, when the two pieces of data, the updated data received from the management server 90 and the operation screen data in the distribution destination apparatus, have the same update date and time, the transfer apparatus 10a regards the two pieces of data as the same data.

Thereafter, the transfer apparatus 10a determines permission or refusal of transmission of the updated data, based on the decision result of presence or absence of the updated data of the update target user U1 in the distribution destination apparatus.

For example, when the operation screen data in the distribution destination apparatus has update date and time older than the updated data acquired from the management server 90, the transfer apparatus 10a decides that the distribution destination apparatus does not have the updated data (operation screen data having the same update date and time as the update date and time of the updated data) of the update target user U1. Here, the update date and time of the operation screen data of the update target user U1 in the distribution destination apparatus 10b is 15:00 on Aug. 9, 2017 (see FIG. 19), and the operation screen data in the distribution destination apparatus 10b has update date and time older than the update date and time (9:30 on Sep. 2, 2017) of the updated data acquired from the management server 90. In such a case, the transfer apparatus 10a decides that the distribution destination apparatus 10b does not have the updated data of the update target user U1. Then, the transfer apparatus 10a determines that the updated data of the update target user U1 should be transmitted to the distribution destination apparatus 10b, and transmits the updated data of the update target user U1 to the distribution destination apparatus 10b (step S16). Thereafter, the distribution destination apparatus 10b executes the update processing of the operation screen data of the user U1, based on the updated data acquired from the transfer apparatus 10a.

On the other hand, when the operation screen data in the distribution destination apparatus has the same update date and time as the update date and time of the updated data acquired from the management server 90, the transfer apparatus 10a decides that the distribution destination apparatus has the updated data (operation screen data having the same update date and time as the update date and time of the updated data) of the update target user U1. Here, the update date and time of the operation screen data of the update target user U1 in the distribution destination apparatus 10c is 9:30 on Sep. 2, 2017 (see FIG. 19), and the operation screen data in the distribution destination apparatus 10c has the same update date and time as the update date and time (9:30 on Sep. 2, 2017) of the updated data acquired from the management server 90. In such a case, the transfer apparatus 10a decides that the distribution destination apparatus 10c has the updated data of the update target user U1. Then, the transfer apparatus 10a determines that the updated data of the update target user U1 should not be transmitted to the distribution destination apparatus 10c (the updated data of the update target user U1 is not to be transmitted to the distribution destination apparatus 10c). In other words, even in a case where the MFP 10c is determined as the distribution destination apparatus, when the operation screen data having the same update date and time as the updated data from the management server 90 already exists in the MFP 10c, the updated data of the update target user U1 Is not transmitted to the MFP 10c.

As described above, the updated data does not have to be transmitted to the apparatus having the updated data (operation screen data having the same update date and time as the update date and time of the updated data acquired from the management server 90) of the update target user U1, among the MFPs 10 determined as the distribution destination apparatuses. In other words, the updated data may be transmitted to (only) the apparatus not having the updated data of the update target user U1 among the MFPs 10 determined as the distribution destination apparatuses.

With this configuration, unnecessary transmission processing (transmission processing of updated data) can be reduced.

Modification on Transfer Apparatus

In the above-described embodiments, one MFP 10 among the plural MFPs 10 (10a to 10d) operates as the transfer apparatus for the updated data; however, this is not a limitation, and an apparatus other than the plural MFPs 10 (10a to 10d) may operate as the transfer apparatus for the updated data.

For example, a server (a local server 50 (FIG. 20)) provided inside the LAN to which the plural MFPs 10 belong may operate as a transfer apparatus for the updated data.

Specifically, in response to acquisition of update execution information indicating that the operation screen data of the user U1 has been updated by customization, for example, the local server 50 receives the updated data of the user U1 from the management server 90 (external server) (see FIG. 20). Thereafter, the local server 50 determines, as distribution destination apparatuses of the updated data, some apparatuses (some apparatuses including an apparatus already used by the user U1) (for example, the MFPs 10a, 10b, and 10c) among plural distribution destination candidate apparatuses (plural other information processing apparatuses (here, the plural MFPs 10a to 10d)). Then, the local server 50 transfers the updated data to the some apparatuses 10a, 10b, and 10c determined as the distribution destination apparatuses among the plural distribution destination candidate apparatuses 10a to 10d (see FIG. 20).

As described above, the apparatus other than the plural MFPs 10 (10a to 10d) may operate as the transfer apparatus for the updated data.

Modification on Distribution Path of Updated Data to Distribution Destination Apparatus In the above-described embodiments, the updated data of the update target user is transmitted from the management server 90 to the distribution destination apparatus via the transfer apparatus (see FIG. 3 and the like); however, this is not a limitation. For example, the updated data of the update target user may be directly transmitted from the management server 90 to the distribution destination apparatus (see FIG. 21). In other words, the management server 90 may function as an information processing apparatus (update control apparatus) that controls transmission processing of updated data and the like to the distribution destination apparatus in the information processing system 1.

Specifically, first, the management server 90 decides presence or absence of update of the operation screen data of each user at a predetermined timing in the management server 90, and acquires a decision result that, for example, time operation screen data of the user U1 has been updated by customization, as update execution information. Then, the management server 90 inquires of distribution destination candidate apparatuses (here, the MFPs 10a to 10d) use histories by the user U1 of the distribution destination candidate apparatuses, to acquire the use histories. Thereafter, the management server 90 determines, as distribution destination apparatuses of the updated data, some apparatuses (some apparatuses including an apparatus already used by the update target user U1) (here, MFPs 10a to 10c) among the plural distribution destination candidate apparatuses 10a to 10d, and transmits (broadcasts) the updated data of the update target user U1 to the MFPs 10a to 10c determined as the distribution destination apparatuses (see FIG. 21). Note that, here, the management server 90 inquires of the distribution destination candidate apparatuses the use histories by the user U1 of the distribution destination candidate apparatuses, to acquire the use histories; however, this is not a limitation. For example, when the use history of each distribution destination candidate apparatus is managed (stored) for each user in the management server 90, the management server 90 may acquire the use history by the user U1 of each distribution destination candidate apparatus from the management server 90.

As described above, the management server 90 may directly transmit the updated data of the specific user (update target user) to the some apparatuses (some apparatuses including the apparatus already used by the specific user) among the plural distribution destination candidate apparatuses.

However, instead of being directly transmitted from the management server 90 (apparatus outside the LAN) to the some apparatuses (distribution destination apparatuses) among the plural distribution destination candidate apparatuses (apparatuses inside the LAN), the updated data is preferably transmitted from the management server 90 to the some apparatuses (distribution destination apparatuses) via the transfer apparatus (apparatus inside the LAN). In particular, in a case where the updated data is transmitted to a large number of distribution destination apparatuses (for example, 100 MFPs 10), the updated data is more preferably transmitted from the management server 90 to the distribution destination apparatuses via the transfer apparatus.

Specifically, when the updated data is directly transmitted (broadcasted) from the management server 90 outside the LAN to a large number of distribution destination apparatuses inside the LAN, communication is performed in a relatively low speed network outside the LAN, and the distribution speed is reduced of the updated data to the large number of distribution destination apparatuses. On the other hand, when the updated data is transmitted (transferred) from the management server 90 to the distribution destination apparatuses via the transfer apparatus (one apparatus inside the LAN), communication is mainly performed in a relatively high speed network inside the LAN. Therefore, the distribution speed can be improved of the updated data to the distribution destination apparatuses.

Modification on Management Apparatus

In the above-described embodiments, the management server 90 operates as a management apparatus that manages managed information for each user; however, this is not a limitation. For example, a specific MFP 10 (for example, the MFP 10e (FIG. 22 or 23)) provided separately from the plural MFPs 10 (MFPs 10a to 10d) may also operate as the management apparatus. Specifically, the updated data of the specific user may be transmitted (transferred) from the specific MFP 10e (management apparatus) to the distribution destination apparatuses via the transfer apparatus (see FIG. 22). Alternatively, the updated data of the specific user may be transmitted from the specific MFP 10e (management apparatus) directly to the distribution destination apparatuses (see FIG. 23).

Modification on Managed Information

In the above-described embodiments, the operation screen information (operation screen data) on the operation screen (operation screen corresponding to each user) that can be displayed on each MFP 10 is managed as managed information in the management apparatus; however, this is not a limitation, and other information may be managed as managed information in the management apparatus. For example, authentication information (authentication information corresponding to each user) (for example, a user ID and a password) that can be used at the time of accessing a cloud service in each MFP 10 may be managed as managed information. Alternatively, information (transmission destination information) on a transmission destination (transmission destination corresponding to each user) that can be used in a transmission job (facsimile job or the like) in each MFP 10 may be managed as managed information.

Others

In the above-described embodiments, the updated data of the update target user is transmitted to the apparatus already used by the update target user among the plural distribution destination candidate apparatuses, and the updated data is not transmitted to the apparatus not used by the update target user; however, this is not a limitation. For example, when there are plural apparatuses not used, the updated data of the update target user is transmitted to the apparatus already used by the update target user, and the updated data may also be transmitted exceptionally to some apparatuses not used among the plural apparatuses not used. In other words, the apparatus already used by the update target user and some apparatuses not used among the plural apparatuses not used may be determined as the distribution destination apparatuses (some apparatuses among the plural distribution destination candidate apparatuses) of the updated data of the update target user.

Specifically, among the plural distribution destination candidate apparatuses, the apparatus already used by the update target user is determined as the distribution destination apparatus of the updated data of the update target user, and the updated data is transmitted to the apparatus already used. On the other hand, among the plural distribution destination candidate apparatuses, the apparatus not used by the update target user is not determined as the distribution destination apparatus in principle, and the updated data of the update target user is not transmitted to the apparatus not used. However, when there are the plural apparatuses not used, among the plural apparatuses not used, apparatuses not used (some apparatuses not used) provided in a room where the update target user exists may be exceptionally determined as distribution destination apparatuses, and the updated data may be transmitted to the some apparatuses not used. In other words, to apparatuses not used (some apparatuses not used) having relatively higher possibilities of being used by the update target user than those of apparatuses not used in rooms other than the room where the update target user exists, the updated data of the update target user may be exceptionally transmitted. Note that, among the plural apparatuses not used, to apparatuses not used (remaining apparatuses not used) other than the apparatus not used provided in the room where the update target user exists, the updated data is not transmitted in principle.

In the above-described embodiments, a mode has been exemplified in which the plural distribution destination candidate apparatuses (and transfer apparatuses) are MFPs; however, this is not a limitation, and the plural distribution destination candidate apparatuses (and transfer apparatuses) may be so-called personal computers or the like instead of the MFPs.

Although embodiments of the present invention have been described and illustrated in detail, the disclosed embodiments are made for purposes of illustration and example only and not limitation. The scope of the present invention should be interpreted by terms of the appended claims.

What is claimed is:

1. An information processing apparatus enabled to share managed information that is managed and customizable for an individual user with a plurality of other information processing apparatuses, the information processing apparatus comprising
a hardware processor that:
acquires update information indicating that managed information of a specific user among a plurality of users has been updated by customization;
determines some information processing apparatuses among the plurality of other information processing apparatuses, as distribution destination apparatuses to share updated managed information of the specific user, based on a use history of the specific user, after acquisition of the update information; and
transmits the updated managed information to the some information processing apparatuses determined as the distribution destination apparatuses, after the acquisition of the update information.

2. The information processing apparatus according to claim 1, wherein
the information processing apparatus is a transfer apparatus that is provided separately from a management apparatus that manages managed information for each user, and executes transfer processing of the updated managed information from the management apparatus to the some information processing apparatuses, and
the hardware processor receives the updated managed information from the management apparatus, and transfers the updated managed information received from the management apparatus to the some information processing apparatuses.

3. The information processing apparatus according to claim 2, wherein
the transfer apparatus and the plurality of other information processing apparatuses are provided inside a predetermined LAN, and
the management apparatus is an external server provided outside the predetermined LAN.

4. The information processing apparatus according to claim 2, wherein
the hardware processor:
acquires an update notification that is a notification that the managed information of the specific user has been updated in the management apparatus, as the update information, front the management apparatus; and
in response to acquisition of the update notification, receives the updated managed information of the specific user from the management apparatus and transfers the updated managed information to the some information processing apparatuses.

5. The information processing apparatus according to claim 2, wherein
the hardware processor:
inquires of the management apparatus presence or absence of update of the managed information of the specific user;
acquires an inquiry result from the management apparatus as the update information; and
in response to acquisition of the inquiry result, receives the updated managed information of the specific user from the management apparatus and transfers the updated managed information to the some information processing apparatuses.

6. The information processing apparatus according to claim 1, wherein
the hardware processor:
when the update information indicating that managed information of a first specific user and managed information of a second specific user have been updated in the management apparatus is acquired from the management apparatus, compares a first total number of times of use with a second total number of times of use, the first total number of times of use being a total value of numbers of times of use by the first specific user with respect to respective predetermined plurality of apparatuses including the plurality of other information processing apparatuses, the second total number of times of use being a total value of numbers of times of use by the second specific user with respect to the respective predetermined plurality of apparatuses; and
when the first total number of times of use is greater than the second total number of times of use, determines that updated managed information of the first specific user is to be transferred to the some information processing apparatuses earlier than updated managed information of the second specific user.

7. The information processing apparatus according to claim 4, wherein
the hardware processor:
when the update information indicating that managed information of a first specific user and managed information of a second specific user have been updated is acquired from the management apparatus, compares a first latest use time point with a second latest use time point, the first latest use time point being a latest use time point among most recent use time points by the first specific user with respect to respective predetermined plurality of apparatuses including the plurality of other information processing apparatuses, the second latest use time point being a latest use time point among most recent use time points by the second specific user with respect to the respective predetermined plurality of apparatuses; and
when the first latest use time point is newer than the second latest use time point, determines that updated managed information of the first specific user is to be transferred to the some information processing apparatuses earlier than updated managed information of the second specific user.

8. The information processing apparatus according to claim 6, wherein
the predetermined plurality of apparatuses is any of the transfer apparatus and the plurality of other information processing apparatuses, or the plurality of other information processing apparatuses.

9. The information processing apparatus according to claim 6, wherein
even when it is determined that the updated managed information of the first specific user is to be transferred earlier than the updated managed information of the second specific user, when it is decided that the first specific user is not in an installation room of the some information processing apparatuses, the hardware processor transfers the updated managed information of the second specific user, not the first specific user, earlier to the some of the information processing apparatuses.

10. The information processing apparatus according to claim 6, wherein
even when it is determined that the updated managed information of the first specific user is to be transferred earlier than the updated managed information of the second specific user, when it is decided that the first specific user is in a meeting, the hardware processor transfers the updated managed information of the second specific user, not the first specific user, earlier to the some of the information processing apparatuses.

11. The information processing apparatus according to claim 6, wherein
even when it is determined that the updated managed information of the first specific user is to be transferred earlier than the updated managed information of the second specific user, when it is decided that the first specific user is not in an office, the hardware processor transfers the updated managed information of the second specific user, not the first specific user, earlier to the some of the information processing apparatuses.

12. The information processing apparatus according to claim 1, wherein
when there is a plurality of distribution destination apparatuses, the hardware processor executes transmission of the updated managed information to the plurality of distribution destination apparatuses in order from an apparatus having a larger number of times of use by the specific user among the plurality of distribution destination apparatuses.

13. The information processing apparatus according to claim 1, wherein
when there is a plurality of distribution destination apparatuses, the hardware processor executes transmission of the updated managed information to the plurality of distribution destination apparatuses in order from an apparatus having a newer most recent use time point by the specific user among the plurality of distribution destination apparatuses.

14. The information processing apparatus according to claim 1, wherein
when there is a plurality of distribution destination apparatuses, the hardware processor transmits the updated managed information of the specific user to a distribution destination apparatus provided in a room where the specific user exists among the plurality of distribution destination apparatuses earlier than a distribution destination apparatus provided in a room other than the room where the specific user exists.

15. The information processing apparatus according to claim 1, wherein
the hardware processor does not transmit the updated managed information to an apparatus having the updated managed information of the specific user among the some information processing apparatuses.

16. The information processing apparatus according to claim 1, wherein
the information processing apparatus is a management apparatus that manages managed information for each user, and
the hardware processor directly transmits the updated managed information in the management apparatus to the some information processing apparatuses.

17. The information processing apparatus according to claim 1, wherein
the information processing apparatus is an image processing apparatus.

18. The information processing apparatus according to claim 1, wherein
the plurality of other information processing apparatuses is respectively image processing apparatuses.

19. The information processing apparatus according to claim 5, wherein
the transfer apparatus is an image processing apparatus, and
the hardware processor:
when inquiring of the management apparatus presence or absence of update of managed information of a first user and presence or absence of update of managed information of a second user, compares a first number of times of use that is a number of times of use of the image processing apparatus by the first user with a second number of times of use that is a number of times of use of the image processing apparatus by the second user; and
when the first number of times of use is greater than the second number of times of use, determines that the presence or absence of update of the managed information of the first user is to be inquired earlier than the presence or absence of update of the managed information of the second user.

20. The information processing apparatus according to claim 5, wherein
the transfer apparatus is an image processing apparatus, and
the hardware processor:
when inquiring of the management apparatus presence or absence of update of managed information of a first user and presence or absence of update of managed information of a second user, compares a first most recent use time point that is a most recent use time point of the image processing apparatus by the first user with a second most recent use time point that is a most recent use time point of the image processing apparatus by the second user; and
when the first most recent use time point is newer than the second most recent use time point, determines that the presence or absence of update of the managed information of the first user is to be inquired earlier than the presence or absence of update of the managed information of the second user.

21. The information processing apparatus according to claim 19, wherein
even when it is determined that the presence or absence of update of the managed information of the first user is to be inquired earlier than the presence or absence of update of the managed information of the second user, when it is decided that the first user is not in an installation room of the image processing apparatus, the hardware processor inquires the presence or absence of update of the managed information of the second user, not the first user, earlier.

22. The information processing apparatus according to claim 19, wherein
even when it is determined that the presence or absence of update of the managed information of the first user is to be inquired earlier than the presence or absence of update of the managed information of the second user, when it is decided that the first user is in a meeting, the hardware processor inquires the presence or absence of update of the managed information of the second user, not the first user, earlier.

23. The information processing apparatus according to claim 19, wherein
even when it is determined that the presence or absence of update of the managed information of the first user is to be inquired earlier than the presence or absence of update of the managed information of the second user, when it is decided that the first user is not in an office, the hardware processor inquires the presence or absence of update of the managed information of the second user, not the first user, earlier.

24. The information processing apparatus according to claim 1, wherein
the managed information of the specific user includes information on an operation screen that is displayable in the plurality of other information processing apparatuses and corresponds to the specific user.

25. The information processing apparatus according to claim 1, wherein
the managed information of the specific user includes authentication information corresponding to the specific user.

26. The information processing apparatus according to claim 1, wherein
the managed information of the specific user includes information on a transmission destination corresponding to the specific user.

27. A control method of an information processing apparatus enabled to share managed information that is managed and customizable for an individual user with a plurality of other information processing apparatuses, the control method comprising:
a) acquiring update information indicating that managed information of a specific user among a plurality of users has been updated by customization;
b) determining some information processing apparatuses among the plurality of other information processing apparatuses, as distribution destination apparatuses to share updated managed information of the specific user, based on a use history of the specific user, after acquisition of the update information; and
c) transmitting the updated managed information to the some information processing apparatuses determined as the distribution destination apparatuses in the b).

28. A non-transitory recording medium storing a computer readable program causing a computer, which controls the information processing apparatus, to perform the control method according to claim 27.

29. An information processing system comprising:
an information processing apparatus; and
a plurality of other information processing apparatuses, wherein
the information processing apparatus is enabled to share managed information that is managed and customizable for an individual user with the plurality of other information processing apparatuses, and
the information processing apparatus includes a hardware processor that:
acquires update information indicating that managed information of a specific user among a plurality of users has been updated by customization;
determines some information processing apparatuses among the plurality of other information processing apparatuses, as distribution destination apparatuses to share updated managed information of the specific user, based on a use history of the specific user, after acquisition of the update information; and
transmits the updated managed information to the some information processing apparatuses determined as the distribution destination apparatuses, after the acquisition of the update information.

\* \* \* \* \*